(12) United States Patent
Fussnegger et al.

(10) Patent No.: US 9,982,074 B2
(45) Date of Patent: May 29, 2018

(54) USE OF COMPOSITE FILMS AS A PACKAGING MATERIAL FOR OXIDATION-SENSITIVE POLYMERS, METHOD FOR PACKAGING OXIDATION-SENSITIVE POLYMERS, AND PACKAGING CONTAINING SAID COMPOSITE FILMS

(75) Inventors: Bernhard Fussnegger, Kirrweiler (DE); Karl-Hermann Strube, Speyer (DE); Reinhold Dieing, Speyer (DE)

(73) Assignee: BASF SE, Ludwigshafen (DE)

( * ) Notice: Subject to any disclaimer, the term of this patent is extended or adjusted under 35 U.S.C. 154(b) by 0 days. days.

(21) Appl. No.: 13/127,370

(22) PCT Filed: Oct. 8, 2009

(86) PCT No.: PCT/EP2009/063090
§ 371 (c)(1),
(2), (4) Date: May 3, 2011

(87) PCT Pub. No.: WO2010/052088
PCT Pub. Date: May 14, 2010

(65) Prior Publication Data
US 2011/0220534 A1  Sep. 15, 2011

(30) Foreign Application Priority Data

Apr. 11, 2008 (EP) ..................... 08168298
Jan. 16, 2009 (DE) ................ 20 2009 000 692 U
Sep. 9, 2009 (JP) ................. 2009-006450

(51) Int. Cl.
*B65D 85/00* (2006.01)
*C08F 16/06* (2006.01)
(Continued)

(52) U.S. Cl.
CPC ............. *C08F 210/02* (2013.01); *B65D 31/02* (2013.01); *B65D 31/10* (2013.01); *C08L 39/06* (2013.01); *C08L 77/00* (2013.01)

(58) Field of Classification Search
CPC ......... Y10T 428/1334; Y10T 428/1379; Y10T 428/12; Y10T 428/1352; Y10T 428/1341;
(Continued)

(56) References Cited

U.S. PATENT DOCUMENTS 3,760,031 A * 9/1973 Sato et al. ...................... 525/65
4,239,826 A * 12/1980 Knott, II ................ B32B 27/30
428/36.7

(Continued)

FOREIGN PATENT DOCUMENTS

EP  0805177  11/1997
EP  873130   10/1998
(Continued)

OTHER PUBLICATIONS http://www.spectra-analysis.com/documents/AppNote016Polyethyleneglycol.pdf (Mar. 2008).*
(Continued)

*Primary Examiner* — James C Yager
*Assistant Examiner* — Kevin C Ortman, Jr.
(74) *Attorney, Agent, or Firm* — Drinker Biddle & Reath LLP

(57) ABSTRACT

Disclosed is a method of making packaging material for polymers susceptible to oxidation. The packaging material utilizes a composite foil. The composite foil has at least three layers and have barrier layers based on polyvinyl alcohols. The composite foil may be used to package polymers susceptible to oxidation. Also disclosed is a process for packaging the polymers and the packaging composed of the composite foil.

21 Claims, 9 Drawing Sheets diagram of structure of a composite foil 1, 5: external layer of composite foil
3, 3': barrier layers
2, 4, 6: adhesive layers

(51) Int. Cl.
    *C08F 210/02*    (2006.01)
    *B65D 30/08*     (2006.01)
    *B65D 30/20*     (2006.01)
    *C08L 39/06*     (2006.01)
    *C08L 77/00*     (2006.01)

(58) Field of Classification Search
    CPC ....... C08F 210/02; B65D 31/02; B65D 31/10;
                B65D 81/268; C08L 39/06; C08L 77/00
    USPC ................... 428/35.4, 35.7, 35.2; 206/524.6
    See application file for complete search history.

(56) References Cited

U.S. PATENT DOCUMENTS

| | | | | |
|---|---|---|---|---|
| 4,548,985 | A | * | 10/1985 | Yazaki .................. C09J 151/06 525/64 |
| 5,346,644 | A | * | 9/1994 | Speer et al. ............. 252/188.28 |
| 5,358,785 | A | * | 10/1994 | Akao et al. .................... 428/349 |
| 5,635,261 | A | * | 6/1997 | Georgelos et al. .......... 428/35.4 |
| 6,331,333 | B1 | | 12/2001 | Wu et al. |
| 6,498,231 | B2 | | 12/2002 | Tomihisa et al. |
| 6,592,900 | B1 | * | 7/2003 | Buhler ................ A61K 9/2027 424/400 |
| 6,596,807 | B2 | * | 7/2003 | Oshita et al. ................. 524/557 |
| 2001/0038894 | A1 | * | 11/2001 | Komada .................. B32B 7/02 428/34.6 |
| 2002/0022144 | A1 | * | 2/2002 | Yang .................. A22C 13/0013 428/520 |
| 2006/0292323 | A1 | * | 12/2006 | Hutchinson et al. ...... 428/36.91 |
| 2007/0259142 | A1 | | 11/2007 | Lischefski et al. |

FOREIGN PATENT DOCUMENTS

| | | |
|---|---|---|
| EP | 1083884 | 3/2001 |
| GB | 836831 | 6/1960 |
| JP | 09-216653 | 8/1997 |
| JP | 09-226070 | 9/1997 |
| JP | 2000-44756 | 8/2001 |
| JP | 2002-3609 | 7/2003 |
| WO | WO-97/25052 | 7/1997 |
| WO | WO-00/59478 | 10/2000 |
| WO | WO-2006/015765 | 2/2006 |

OTHER PUBLICATIONS

V. Buhler, Polyvinylpyrrolidone Excipients for Pharmaceuticals, Povidone, Crospovidone and Copovidone, Springer-Verlag Berlin Heidelberg, 2005, p. 1-254.*
Han, et al., "Thermal/oxidative degradation and stabilization of polyethylene glycol," Polymer., vol. 38, No. 2, 1997, p. 317-323.*
Dict (Webster's Revised Unabridged Dictionary, 1913, C. & G. Merriam Co., Springfield, Mass. Under the direction of Noah Porter, D.D., LL.D., "Adjacent," p. 1-5).*
Breitenbach et al., IUPAC International Symposium on Macromolecular Chemistry, Budapest 1969 (pp. 529-544).

* cited by examiner

FIG. 1: diagram of structure of a composite foil
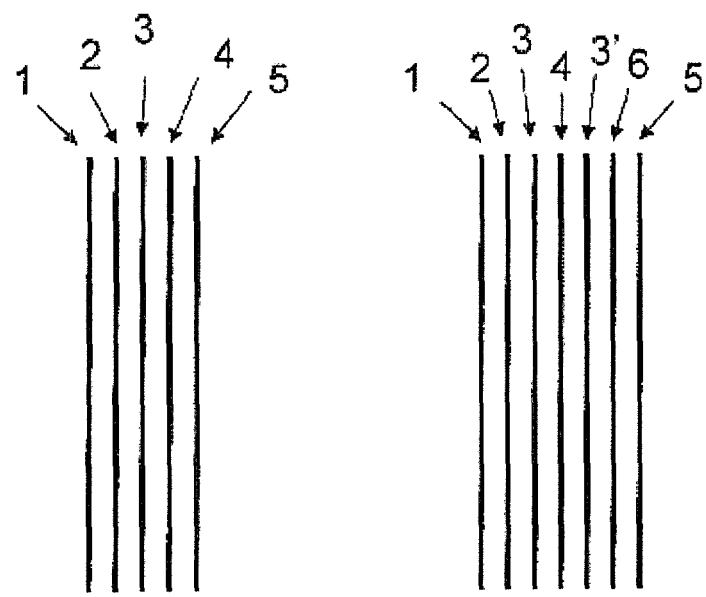
1, 5:   external layer of composite foil
3, 3':  barrier layers
2, 4, 6: adhesive layers FIG. 2: "flat bag" packaging (diagram)
Dotted lines: seal provided by welding or adhesive bonding
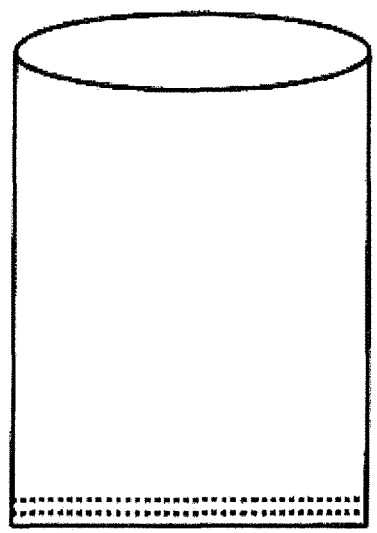

FIG. 3: "side-gusset bag" packaging (diagram)
Side view
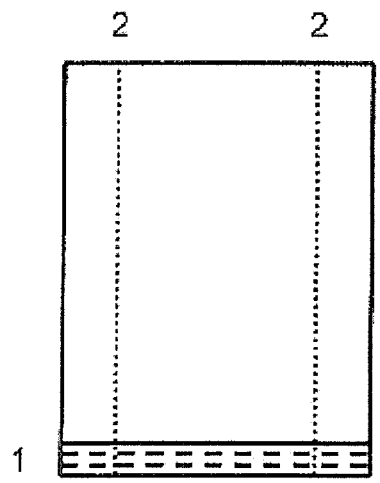
Cross section (from above; bag partially opened)
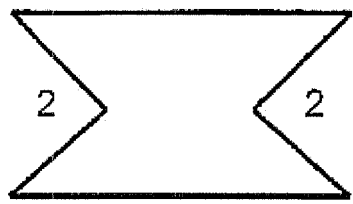
View from below
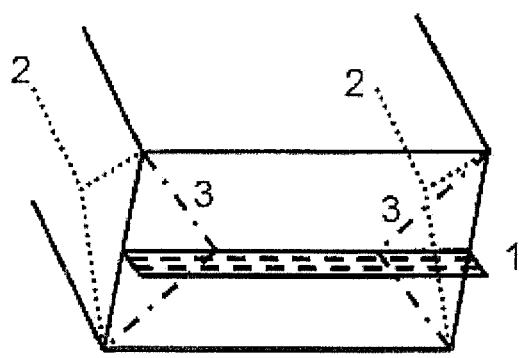
- - -   1: seal provided by welding or adhesive bonding (broken line)
·····   2: side gusset (dotted line)
·—·—   3: basal gusset (in this case internal) (dotted/broken line)

FIG. 4: sealing process – adhesive bonding, taking the example of a flexible foil tube
Seal, single adhesive bonding
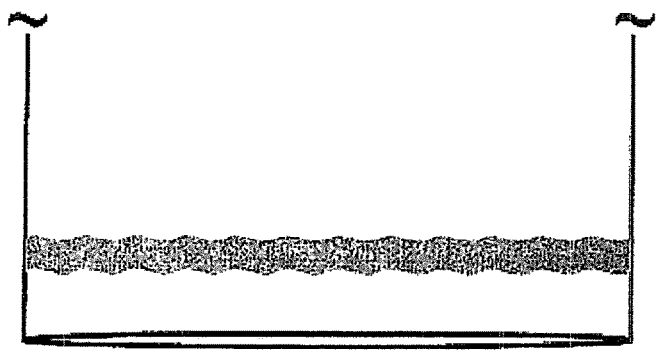
Seal, double adhesive bonding
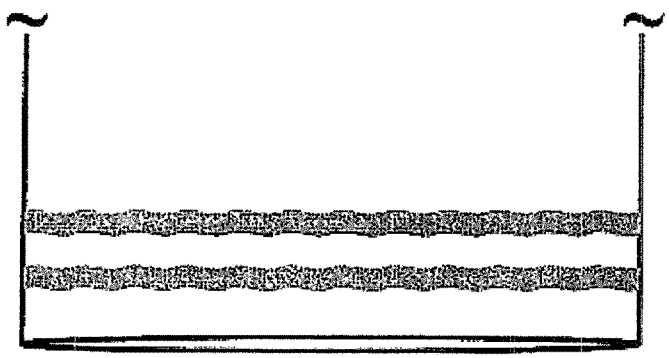
Seal, double adhesive bonding with foldover
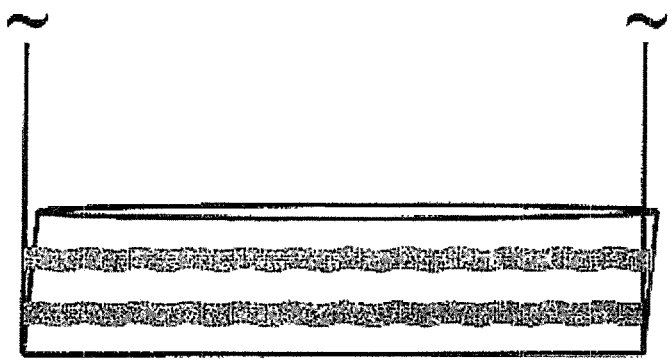

FIG. 5: sealing process – welding, taking the example of a flexible foil tube
Seal, single welding
Seal, double welding
Seal, double welding with fold-over
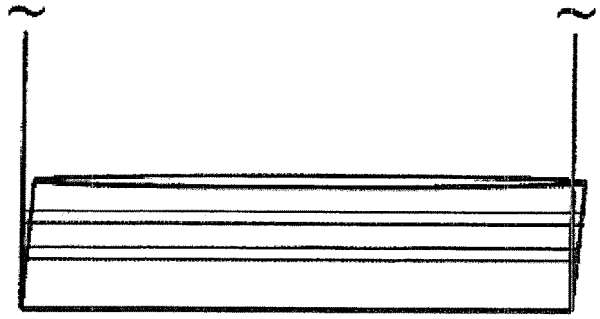

FIG. 6: sealing– clamping, taking the example of a flexible foil tube
Side view:
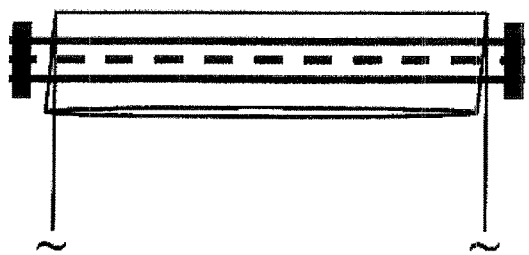
Plan view:
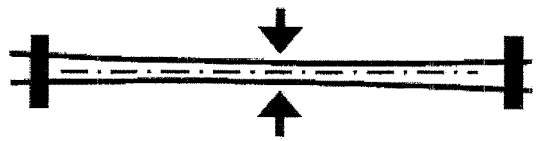
Key:
　Side view:
　　clamp (frontal side)
　　clamp (reverse side)
　　clamp (frontal- and reverse-side-fixing)
　Key for plan view:
　　clamp
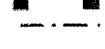　　flexible foil tube
　　clamping (pressure exerted on flexible foil tube)

FIG. 7: sealing – screw-thread method
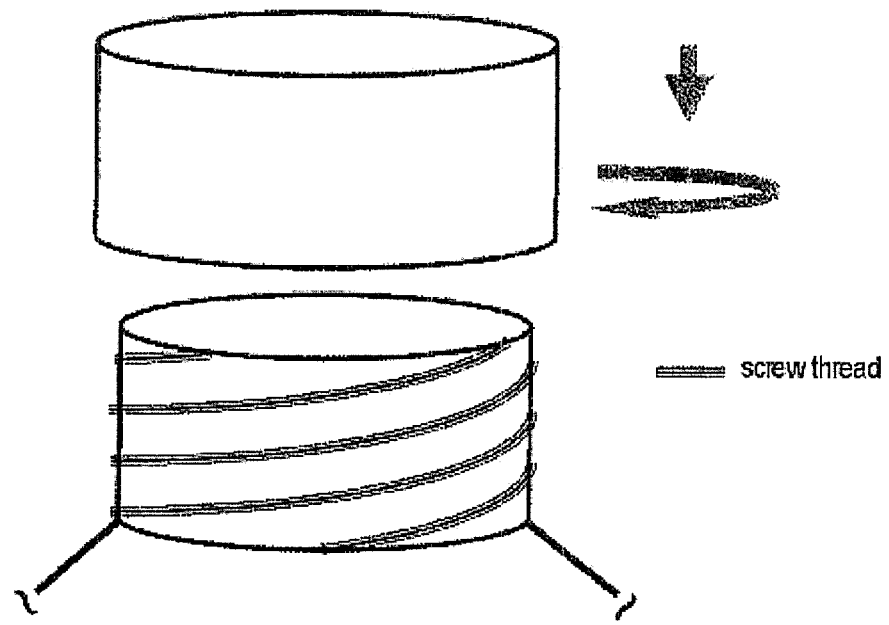
Sealing via placement and clockwise rotation (toward the right)

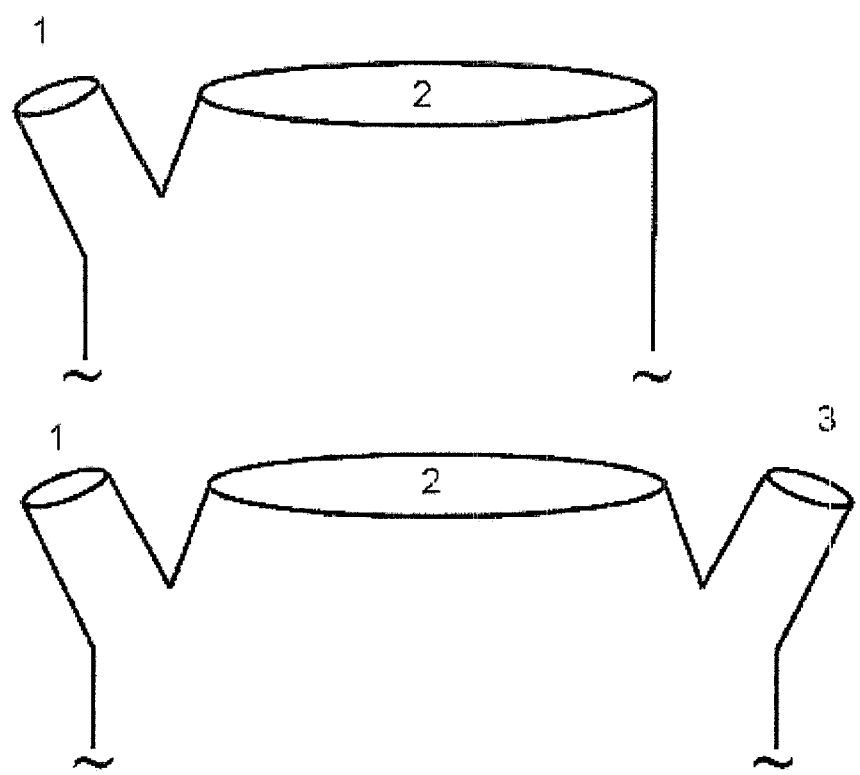
FIG. 8: packaging with two and three apertures
1, 2, 3: apertures in packaging FIG. 9: outer packaging – carton, drum with lid
Drum with lid:
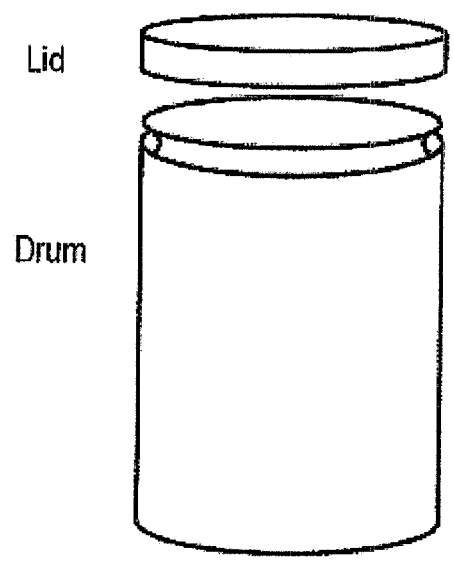
Carton:
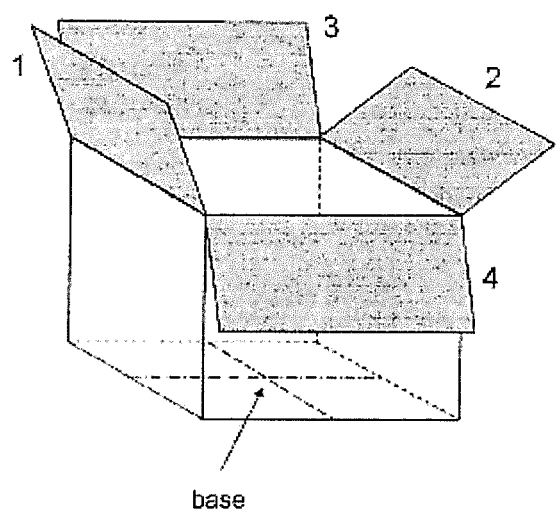
Key: 1, 2, 3, 4: flaps of cover

USE OF COMPOSITE FILMS AS A PACKAGING MATERIAL FOR OXIDATION-SENSITIVE POLYMERS, METHOD FOR PACKAGING OXIDATION-SENSITIVE POLYMERS, AND PACKAGING CONTAINING SAID COMPOSITE FILMS

CROSS-REFERENCE TO RELATED APPLICATIONS

This application is a national stage application (under 35 U.S.C. § 371) of PCT/EP2009/063090, filed Oct. 8, 2009, which claims benefit of European application 08168298.1 filed Nov. 4, 2008, German application 202009000692.1 filed Jan. 16, 2009, and Japanese application 09/006450U filed Sep. 9, 2009. The contents of each of the foregoing applications are incorporated herein by reference in their entireties.

FIELD OF THE INVENTION

The present invention relates to the use of composite foils based on polyvinyl alcohols as packaging material for polymers susceptible to oxidation.

The present invention further relates to packaging comprising contents (packs), where the packaging is composed of composite foil comprising barrier layers based on polyvinyl alcohols. Contents are oxidation-sensitive polymers, and also optionally inert gas.

The present invention moreover relates to outer packaging which comprises the packs.

BACKGROUND OF THE INVENTION

The polymerization process for many polymers susceptible to oxidation, e.g. polyvinylpyrrolidones, for example homo- and copolymers of N-vinylpyrrolidone, is usually followed by spray drying or drum drying or another hot-air drying process to convert the materials into free-flowing powders. During these processes, the intimate contact with air, and the heat, leads to formation of traces of peroxides, the content of which increases still further during the course of subsequent packaging and storage. This tendency toward peroxide formation may pose problems during use in pharmaceutical preparations. Comparable problems also arise with polyethers or polyamides. Examples of further oxidative effects are discoloration of the polymers and changes in molecular weight.

By way of example, the peroxide content for said polyvinylpyrrolidones is limited to a maximum of 400 ppm in the current pharmacopeias, e.g. Ph. Eur. 6, and JP XIV. Although the kinetics of peroxide formation can be slowed by drying in the absence of air, storage at low temperatures, or hermetically sealed packaging in vacuo or under an inert gas, these methods cannot prevent peroxide formation. Furthermore, said methods are very costly, and are therefore unpopular with users.

Many previous attempts have been made to provide chemical stabilization of polymers susceptible to oxidation, in order to prevent peroxide formation.

It is well known that antioxidants can be used to prevent undesired oxidative processes, examples being phenolic antioxidants, ascorbic acid, ethoxyquin, butylhydroxytoluene, butylhydroxyanisol, tocopherol, or nordihydroguaiaretic acid (NDGA). It is also known that phenolic antioxidants have only limited suitability, because of their lack of biodegradability (cf. Römpp-Chemie-Lexikon [Rompp's Chemical Encyclopedia], 9th edition, Georg Thieme Verlag, Stuttgart, 1992).

U.S. Pat. No. 6,331,333 discloses that polyvinylpyrrolidones are stored in packaging impermeable to oxygen, in the presence of an oxygen scavenger, in order to prevent peroxide formation during storage. Oxygen scavengers used are ascorbic acid, iron powder, or iron salts. There is spatial separation here between oxygen scavengers and polyvinylpyrrolidone.

U.S. Pat. No. 6,498,231 discloses that polyvinylpyrrolidones are mixed with an antioxidant for stabilization during storage and are stored under an atmosphere comprising no more than 50 000 ppm of oxygen. Examples of antioxidants used are phenolic or bisphenolic compounds, preferably thioamide derivatives or thiourea derivatives. However, antioxidants of this type are not entirely free from physiological risk and are quite unsuitable if the polymers are to be used in pharmaceutical preparations.

GB 836,831 discloses a method for the stabilization of polyvinylpyrrolidones with respect to discoloration, by treating solutions of the polymers with sulfur dioxide, sulfurous acid, or alkali metal sulfites. However, it has been found that use of this method actually leads, after storage, to more peroxide formation than in untreated polymers.

EP-B 1083 884 describes a method for the stabilization of polyvinylpyrrolidones with respect to peroxide formation by admixing very small amounts of heavy metals, or enzymes that cleave peroxides, with aqueous solutions of the polymers. However, the use of heavy metals is disadvantageous because of the possibility of accumulation of the heavy metals in the body. The use of enzymes is disadvantageous mainly for reasons of costs and stability.

Furthermore, however, chemical stabilization has proven unsuccessful specifically with crosslinked polymers, such as crospovidone.

Another way of suppressing autoxidation of polymers susceptible to oxidation is to keep the polymers in oxygen-impermeable packaging, after work-up.

EP-B 873 130 recommends spray-drying polyvinylpyrrolidones in a nitrogen atmosphere to prevent peroxide formation and keeping them in airtight containers.

Composite foils composed of polyethylene and aluminum are also used as packaging material for substances susceptible to oxidation. Although films of this type in principle have good barrier properties, because they are in essence impermeable to oxygen, they have the disadvantage that mechanical damage to the barrier layer is practically impossible to avoid during handling, and can lead to severe impairment of the barrier property. Even microcracks are enough to impair the impermeability of the foils to oxygen.

JP-A 09-226070, JP-A 2000-44756, JP-A 09-216653, or JP-A 2002-3609 disclose composite foils with polyvinyl alcohol layers and their use for oxygen-impermeable packaging of foods, cosmetics, detergents, chemicals, or fuel.

WO 2006/015765 discloses tubular multilayer thermoplastic composite foils for the packaging of foodstuffs.

BRIEF SUMMARY OF THE INVENTION

It was an object of the invention to find improved packaging materials for polymers susceptible to oxidation with a tendency toward an increase in the concentration of peroxides, and processes for the use of the packaging materials.

Another object of the invention was to find improved methods of storing and transporting polymers susceptible to oxidation, in particular those with a tendency toward an increase in the concentration of peroxides.

Accordingly, the use of composite foils has been found, where these comprise at least one barrier layer based on polyvinyl alcohol copolymers, as packaging material for polymers susceptible to oxidation.

A process has moreover been found which can pack, in composite foils of this type, polymers susceptible to oxidation.

Packaging comprising contents (packs) have also been found, where the packaging is composed of composite foil comprising barrier layers based on polyvinyl alcohols and the contents are composed of polymers susceptible to oxidation and optionally of inert gas.

BRIEF DESCRIPTION OF THE DRAWINGS

FIG. 1 depicts a 4-ply composite foil, which is composed of a total of up to 7 layers.

FIG. 2 is a diagram of a "flat bag" as a flexible foil-tube packaging.

FIG. 3 is a diagram of a side-gusset bag.

FIG. 4 depicts one embodiment of the seal in the form of adhesive bond and weld.

FIG. 5 depicts another embodiment of the seal in the form of adhesive bond and weld.

FIG. 6 depicts embodiments of the clamping process.

FIG. 7 shows an example of an embodiment of the sealing process using a screw thread.

FIG. 8 shows an example of two types of packaging with two and, respectively, three apertures.

FIG. 9 shows by way of example two types of outer packaging in the form of a carton and also in the form of a drum with lid.

DETAILED DESCRIPTION OF THE PREFERRED EMBODIMENTS

According to the invention, polymers susceptible to oxidation are polymers which are attacked by oxygen. According to the invention, polymers susceptible to oxidation are especially polymers which have a tendency toward an increase in the concentration of peroxides, especially during storage over a prolonged period of a number of months. Polymers susceptible to oxidation are in particular polyethers, polyamides, or homo- and copolymers of N-vinyl compounds.

Polyethers can be polyethylene glycols (PEG) having average molecular weights of from 200 to 35 000 daltons, or the polyethylene oxides having average molecular weights of from 40 000 to 10 000 000 daltons. Polyethers can moreover be block copolymers of ethylene oxide and propylene oxide (poloxamers) of aba type, or the types which are the inverse of these (meroxapols) having the structure bab, where a is a polyoxyethylene structure having an average molecular weight of from 150 daltons to 5000 daltons, and b is a polyoxypropylene structure having an average molecular weight of from 750 daltons to 4500 daltons. Polyethers can also be poloxamines. Poloxamines are structurally composed of an ethylenediamine core, the amino groups of which have been substituted with copolymers composed of variable-length blocks of polyoxyethylene and of polyoxypropylene:

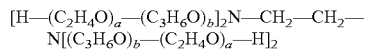

where a and b are variable and can comprise average molecular weights as stated above. Polyethers can also be reaction products obtained via base-catalyzed reaction of ethylene oxide with fatty alcohols, with fatty acids, or with animal or vegetable oils and fats. Examples of these substances are available commercially with trademark Cremophor® or Solutol®. Polyethers can also be compounds known commercially as Tween® 20 to Tween® 85, e.g. polyoxyethylene (20) sorbitan monolaurate, or else the Span®, Brij® or Mrij® products.

The term also comprises polyether-containing copolymers, polymerized from polymerizable polyether monomers and from other monomers. Some examples of polyether-containing monomers are supplied as Bisomer® products and as Pluriol® A products.

The term polyethers also comprises polyether-containing graft polymers, composed of polyethers and of vinyl monomers, an example being vinyl acetate (VAc) and—after its polymerization process—its hydrolysis product vinyl alcohol (VOH), vinyllactams, such as vinylpyrrolidone (VP) and vinylcaprolactam (VCap), vinylamines, such as N-vinylimidazole (VI), N-vinylformamide (VFA) and—after the polymerization process—its hydrolysis product vinylamine. Graft polymers of this type composed of, for example, polyethylene glycol and of vinyl acetate substantially hydrolyzed to give vinyl alcohol after the polymerization process are known for example as Kollicoat IR. Graft polymers composed of polyethylene glycol and vinylpyrrolidone and vinylimidazole, and also composed of polyethylene glycol and vinylcaprolactam with vinyl acetate are also known.

Particularly preferred polyethers are polytetrahydrofuran, graft polymers composed of PEG with VOH, graft polymers composed of PEG with VP and VAc, graft polymers composed of PEG with VCap and VAc, graft polymers composed of PEG with VP and VI, graft polymers composed of PEG with VCap and VI, polyethylene glycols, the compounds marketed with trademark Jeffamine® which are polyoxyalkyleneamines, Poloxamers®, Cremophor®, in particular Cremophor® RH40, a hydrogenated castor oil alkoxylated with 40 EO units, or Cremophor® EL, a castor oil alkoxylated with 35 EO units, and Solutols®, in particular Solutol® HS 15, a product known for example in the pharmaceutical sector as macrogol 15-hydroxystearate.

The term polyamides comprises homo- and copolymers which can be produced via condensation reactions from alkyl- and aryl-containing diamines and diacids, from alkyl- and aryl-containing aminocarboxylic acids or from lactams.

Examples of homo- and copolymers of N-vinyl compounds are the polyvinylpyrrolidones. Polyvinylpyrrolidones are according to the invention the homo- and copolymers of N-vinylpyrrolidone, in particular the water-soluble polyvinylpyrrolidones. According to the invention, other polyvinylpyrrolidones are crosslinked, water-insoluble polyvinylpyrrolidones (crospovidones).

Suitable copolymers preferably have N-vinyl monomer content of at least 20% by weight, as main monomer. Comonomers that can be used are any of the monomers copolymerizable with the main monomer by a free-radical route.

For the purposes of the present invention, copolymers can also be composed of two or more of the main monomers.

There is no limit per se on the number of the comonomers in a polymer. However, it is usually less than 5.

Main monomers are vinyllactams, such as N-vinylpyrrolidone, N-vinylpiperidone, and N-vinylcaprolactam, derivatives of these, such as 3-methyl-, 4-methyl-, and 5-methyl N-vinylpyrrolidone, and also mixtures of these with one another; vinyl esters of aliphatic C1-C22 carboxylic acids, e.g. vinyl acetate, and, obtainable therefrom via hydrolysis after the polymerization process, vinyl alcohol, and also vinyl propionate, vinyl butyrate, vinyl laurate, or vinyl stearate; vinylamides, such as N-vinylformamide, and, obtainable therefrom via hydrolysis after the polymerization process, N-vinylamine, and also N-vinyl-N-methylacetamide; N-vinylimidazoles, which may also have substitution in the 2-, 4-, or 5-position by $C_1$-$C_4$-alkyl or aromatic radicals, in particular methyl or phenyl radicals, examples being 1-vinylimidazole, 2-methyl-1-vinylimidazole, 4-methyl-1-vinylimidazole, 5-methyl-1-vinylimidazole, and also quaternized analogs of these, e.g. 3-methyl-1-vinylimidazolium chloride, 3-methyl-1-vinylimidazolium methyl sulfate, and also diallylamines substituted by $C_1$-$C_{24}$-alkyl on the nitrogen, e.g. diallyldimethyl-amine, and quaternized analogs of these, e.g. diallylammonium chloride and diallyldimethylammonium chloride.

Preferred main monomers are vinyllactams, such as N-vinylpyrrolidone, N-vinylcaprolactam, and 5-methylpyrrolidone, vinyl acetate and, obtainable therefrom via hydrolysis after the polymerization process, vinyl alcohol, N-vinylformamide, and, obtainable therefrom via hydrolysis after the polymerization process, N-vinylamine, and also 1-vinylimidazole, 3-methyl-1-vinylimidazolium chloride, and 3-methyl-1-vinylimidazolium methyl sulfate.

Very particularly preferred main monomers are N-vinylpyrrolidone, N-vinylcaprolactam, vinyl acetate, and, obtainable therefrom via hydrolysis after the polymerization process, vinyl alcohol, and also 1-vinylimidazole.

The invention includes other comonomers. The number of comonomers is not subject to any limit, but is usually no more than four. The comonomers are those selected from the group of the acrylic acids and their amides, and also salts and esters, where the substituents on the carbon atoms are at the 2- or 3-position of the acrylic acid and have been selected independently of one another from the group consisting of $C_1$-$C_{18}$-alkyl, —CN, and —COOH. Examples of acrylic acids are acrylic acid and its anhydride, methacrylic acid, ethylacrylic acid, 3-cyanoacrylic acid, maleic acid, fumaric acid, crotonic acid, maleic anhydride, and also its half-esters, itaconic acid, cinnamic acid, 3-butenoic acid, 4-pentenoic acid, 5-hexenoic acid, 6-heptenoic acid, 7-octenoic acid, 10-undecenoic acid, citraconic acid, or mesaconic acid; acrylamides are acrylamide, N-methylacrylamide, N,N-dimethylacrylamide, N-ethylacrylamide, N-1-propylacrylamide, N-2-propylacrylamide, N-butylacrylamide, N-2-butylacrylamide, N-tert-butylacrylamide, N-octylacrylamide, N-tert-octylacrylamide, N-octadecylacrylamide, N-phenylacrylamide, N-dodecylacrylamide, laurylacrylamide, or stearylacrylamide; methacrylamides are methacrylamide, N-methylmethacrylamide, N,N-dimethyl-methacrylamide, N-ethylmethacrylamide, N-1-propylmethacrylamide, N-2-propylmethacrylamide, N-butylmethacrylamide, N-2-butylmethacrylamide, N-tert-butylmethacrylamide, N-octylmethacrylamide, N-tert-octylmethacrylamide, N-octadecylmethacrylamide, N-phenylmethacrylamide, N-dodecylmethacrylamide, N-laurylmethacrylamide, or stearyl(meth)acrylamide; other amides are ethacrylamide, maleimide, the mono- or diamide of fumaric acid with, for example, ammonia or alkylamines, such as methylamine, the diamide of fumaric acid; possible amino-alkyl(meth)acrylamides are (dimethylamino)methyl(meth)acrylamide, 2-(dimethyl-amino)ethyl(meth)acrylamide, 2-(dimethylamino)propyl(meth)acrylamide, 2-(diethyl-amino)propyl(meth)acrylamide, 3-(dimethylamino)propyl(meth)acrylamide, 3-(diethyl-amino)propyl(meth)acrylamide, 3-(dimethylamino)butyl(meth)acrylamide, 4-(dimethylamino)butyl(meth)acrylamide, 8-(dimethylamino)octyl(meth)acrylamide, 12-(dimethyl-amino)dodecyl(meth)acrylamide, and the analogs of these quaternized at the amine with, for example, methyl chloride, ethyl chloride, dimethyl sulfate, or diethyl sulfate, an example being 3-(trimethylammonium)propyl(meth)acrylamide.

The term also comprises the $C_1$-$C_{18}$-alkyl acrylates, and also their analogous $C_1$-$C_{18}$-alkyl (meth)acrylates, e.g. methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, 2-ethylhexyl (meth)acrylate, decyl (meth)acrylate, dodecyl (meth)acrylate, lauryl (meth)acrylate, stearyl (meth)acrylate, 2,3-dihydroxypropyl (meth)acrylate, 2-hydroxyethyl (meth)acrylate, 2-hydroxypropyl (meth)acrylate, 3-hydroxypropyl acrylate, 2-methoxyethyl (meth)acrylate, 2-methoxy-propyl (meth)acrylate, 3-methoxypropyl (meth)acrylate, 2-ethoxyethyl (meth)acrylate, 2-ethoxypropyl (meth)acrylate, 3-ethoxypropyl (meth)acrylate, glyceryl mono(meth)acrylate, ureidoethyl (meth)acrylate, ureidopropyl (meth)acrylate, or alkylene glycol (meth)acrylates, and polyalkylene glycol (meth)acrylates having a total of from 2 to 200 EO and, respectively, PO units and, respectively, EO/PO units, having a hydrogen, hydroxy, amino, carboxylic acid, sulfonic acid, or alkoxy group, such as methoxy or ethoxy groups, at the chain end.

Other comonomers that can also be used are the $C_1$-$C_{18}$-alkyl ethacrylates, such as methyl ethacrylate, ethyl ethacrylate, n-butyl ethacrylate, isobutyl ethacrylate, tert-butyl ethacrylate, 2-ethylhexyl ethacrylate, decyl ethacrylate, 2-hydroxyethyl ethacrylate, 2-methoxyethyl acrylate, 2-methoxyethyl ethacrylate, and 2-ethoxyethyl ethacrylate. Monomers equally according to the invention are the aminoalkyl acrylates and the aminoalkyl (meth)acrylates which are analogous with these, examples being N,N-dimethylaminomethyl (meth)acrylate, N,N-diethylaminomethyl (meth)acrylate, 2-(N,N-dimethylaminoethyl) (meth)acrylate, 2-(N,N-diethylaminoethyl) (meth)acrylate, 3-(N,N-dimethylaminopropyl) (meth)acrylate, 3-(N,N-diethylaminopropyl) (meth)acrylate, 4-(N,N-dimethylaminobutyl) (meth)acrylate, 4-(N,N-diethylaminobutyl) (meth)acrylate, 6-(N,N-dimethylaminohexyl) (meth)acrylate, 8-(N,N-dimethylamino-octyl) (meth)acrylate, 12-(N,N-dimethylaminododecyl) (meth)acrylate and the analogs of these quaternized at the amine with, for example, methyl chloride, ethyl chloride, dimethyl sulfate, or diethyl sulfate.

The term also includes the alkyl esters and alkylamides and imides of maleic acid: the monoesters can be used, as also can the symmetrical and mixed diesters of maleic acid with methanol, ethanol, 1-propanol, 2-propanol, n-butanol, 2-butanol, tert-butanol, alkylene glycol, or polyalkylene glycol, having a total of from 2 to 200 EO and, respectively, PO units and, respectively, EO/PO units, having a hydrogen, hydroxy, amino, carboxylic acid, sulfonic acid, or alkoxy group, such as methoxy or ethoxy groups, at the chain end, and also the amides analogous to the esters; maleimides that can be used are the imides of alkylamines having $C_1$-$C_4$-alkyl radicals, such as methyl, ethyl, propyl, isopropyl, butyl, isobutyl, or a tert-butyl radical.

Other amine-containing monomers are vinyl- or N-allyl-substituted heterocyclic compounds, such as N-vinylpyridine, 2-vinylpyridine, 3-vinylpyridine, N-allylpyridine, 2-allylpyridine, 3-allylpyridine.

Ether-containing monomers are $C_1$-$C_{18}$-alkyl vinyl ethers, such as methyl, ethyl, butyl, or dodecyl vinyl ethers, $C_1$-$C_{18}$-alkyl allyl ethers, such as methyl, ethyl, butyl, or dodecyl allyl ethers, and also the vinyl or allyl alcohol ethers of polyethylene oxide and, respectively, polypropylene oxide and, respectively, poly(ethylene oxide-co-propylene oxide) having a total of from 2 to 200 EO and, respectively, PO units and, respectively, EO/PO units, having a hydrogen, hydroxy, amino, carboxylic acid, sulfonic acid, or alkoxy group, such as methoxy or ethoxy groups, at the chain end.

Other suitable comonomers are vinyloxazolines, such as N-vinyloxazoline, N-vinylmethyloxazoline, N-vinylethyloxazoline, N-vinylpropyloxazoline, N-vinylbuthyloxazoline, and N-vinylphenyloxazoline.

Other comonomers are vinyl or allyl halides, such as vinyl chloride, allyl chloride, vinylidene chloride, and 4-vinylbenzyl chloride.

Other suitable compounds are olefinically unsaturated hydrocarbons having at least one carbon-carbon double bond, examples being styrene, alpha-methylstyrene, vinyltoluene, tert-butylstyrene, butadiene, isoprene, cyclohexadiene, ethylene, propylene, 1-butene, 2-butene, isobutene, 4-aminostyrene, 3-N,N-dimethylamino-styrene, 3-N,N-diethylaminostyrene, 3-N,N-diphenylaminostyrene, 4-N,N-dimethyl-aminostyrene, 4-N,N-diethylaminostyrene, and 4-N,N-diphenylaminostyrene.

Other suitable monomers are those such as methyl vinyl ketone, vinylfuran, and allyl alcohol.

Other suitable compounds are unsaturated sulfonic acids, e.g. acrylamidopropanesulfonic acid, styrenesulfonate, methacrylamidopropyldimethyl-ammoniumpropylsulfobetaine, the potassium salt of 3-sulfopropyl acrylate, the dipotassium salt of bis(3-sulfopropyl)itaconate, the potassium salt of 3-sulfopropyl methacrylate, sodium 3-allyloxy-2-hydroxypropane-1-sulfonate, vinylbenzenesulfonic acid, vinylsulfonic acid, 2-acrylamido-2-methylethanesulfonic acid, methacrylamidoethyldimethylammoniumpropylsulfobetaine, methacrylamide-ethyldimethylammoniumethylsulfobetaine, the sodium salt of 3-sulfopropyl acrylate, the potassium salt of 3-sulfoethyl acrylate, the sodium salt of 3-sulfoethyl acrylate, the disodium salt of bis(3-sulfopropyl)itaconate, the dipotassium salt of bis(3-sulfoethyl)itaconate, the disodium salt of bis(3-sulfoethyl)itaconate, the potassium salt of 3-sulfoethyl methacrylate, the sodium salt of 3-sulfopropyl methacrylate, the sodium salt of 3-sulfoethyl methacrylate, potassium 3-allyloxy-2-hydroxypropane-1-sulfonate, sodium 3-allyloxy-2-hydroxyethane-1-sulfonate, potassium 3-allyloxy-2-hydroxyethane-1-sulfonate.

Among the comonomers mentioned, preference is given to acrylic acid, methacrylic acid, maleic acid, maleic anhydride, N-methylacrylamide, N,N-dimethylacrylamide, N-2-propylacrylamide, N-tert-butylacrylamide, N-octadecylacrylamide, N-laurylacrylamide, N-stearylacrylamide, methacrylamide, N-methylmethacrylamide, N-2-propylmethacrylamide, N-tert-butylmethacrylamide, N-octadecylmethacrylamide, N-laurylmethacrylamide, stearyl(meth)acrylamide, maleimide, 2-(dimethyl-amino)ethyl(meth)acrylamide, 3-(dimethylamino)propyl(meth)acrylamide, 4-(dimethyl-amino)butyl(meth)acrylamide, methyl acrylate, ethyl acrylate, isopropyl acrylate, tert-butyl acrylate, 2-ethylhexyl acrylate, lauryl acrylate, stearyl acrylate, 2-hydroxyethyl acrylate, 3-hydroxypropyl acrylate, 2-ethoxyethyl acrylate, 3-ethoxypropyl acrylate, ureidoethyl acrylate, ureidopropyl acrylate, alkylene glycol acrylates, and polyalkylene glycol acrylates having a total of from 2 to 200 EO and, respectively, PO units and, respectively, EO/PO units, having a hydrogen, hydroxy, amino, carboxylic acid, sulfonic acid, or alkoxy group, such as methoxy or ethoxy groups, at the chain end, methyl methacrylate, isopropyl methacrylate, n-butyl methacrylate, tert-butyl methacrylate, 2-ethylhexyl methacrylate, stearyl methacrylate, 2-hydroxyethyl methacrylate, 3-hydroxypropyl methacrylate, ureidoethyl methacrylate, ureidopropyl methacrylate, alkylene glycol methacrylates, and polyalkylene glycol methacrylates having a total of from 2 to 200 EO and, respectively, PO units and, respectively, EO/PO units, having a hydrogen, hydroxy, amino, carboxylic acid, sulfonic acid, or alkoxy group, such as methoxy or ethoxy groups, at the chain end, 3-(N,N-dimethylaminopropyl) (meth)acrylate, symmetrical and mixed diesters of maleic acid with methanol, ethanol, 1-propanol, 2-propanol, n-butanol, tert-butanol, methyl vinyl ether, butyl vinyl ether, the ethers of vinyl or allyl alcohol with polyethylene oxide and, respectively, polypropylene oxide and, respectively, poly(ethylene oxide-co-propylene oxide) having a total of from 2 to 200 EO and, respectively, PO units and, respectively, EO/PO units, having a hydrogen, hydroxy, amino, carboxylic acid, sulfonic acid, or alkoxy group, such as methoxy or ethoxy groups, at the chain end; N-vinylimidazoles which may have substitution in the 2-, 4-, or 5-position with $C_1$-$C_4$-alkyl or aromatic radicals, for example in particular methyl or phenyl radicals, acrylamidopropanesulfonic acid and styrenesulfonate.

Among these comonomers, very particular preference is given to acrylic acid, methacrylic acid, maleic acid, maleic anhydride, N-methylacrylamide, N-tert-butylacrylamide, methacrylamide, N-2-propylmethacrylamide, 3-(dimethylamino)propyl-(meth)acrylamide, methyl acrylate, ethyl acrylate, isopropyl acrylate, tert-butyl acrylate, 2-ethylhexyl acrylate, lauryl acrylate, stearyl acrylate, 2-hydroxyethyl acrylate, methyl methacrylate, isopropyl methacrylate, 2-ethylhexyl methacrylate, 2-hydroxyethyl methacrylate, ureidopropyl methacrylate, polyalkylene glycol methacrylates having a total of from 2 to 200 EO and, respectively, PO units and, respectively, EO/PO units, having a hydrogen, hydroxy, amino, carboxylic acid, sulfonic acid, or alkoxy group, such as methoxy or ethoxy groups, at the chain end, and also 3-(N,N-dimethylamino-propyl) (meth)acrylate.

Preferred homo- and copolymers are polyvinylformamide, polyvinylamine, polyvinylcaprolactam, and also the homo- and copolymers of N-vinylpyrrolidone and N-vinylcaprolactam, of N-vinylpyrrolidone with N-vinylcaprolactam, of N-vinylpyrrolidone with N-vinylimidazole, of N-vinylpyrrolidone with vinyl acetate and vinyl propionate, and with its higher homologs having up to 20 carbon atoms in the carboxylic acid, and also of N-vinylpyrrolidone with N-vinylcaprolactam and with further comonomers, in particular with vinyl ethers of aliphatic carboxylic acids, e.g. vinyl acetate, vinyl propionate, and higher homologs of these having up to 20 carbon atoms in the carboxylic acid.

Other preferred polymers are obtained from cationized derivatives of N-vinylimidazole with N-vinylpyrrolidone, with N-vinylcaprolactam, or optionally with further comonomers.

Equally preferred polymers are those obtained from ethyleneimine and optionally from further comonomers; preference is also given to modified products of these polymers from the reaction steps downstream of the polymerization process.

Other polymers preferred according to the invention are crosslinked, water-insoluble polyvinylpyrrolidone polymers such as crospovidone, and also copolymers analogous to crospovidone and composed of N-vinylpyrrolidone and N-vinylimidazole, of N-vinylpyrrolidone and N-vinylcaprolactam, of N-vinylpyrrolidone and vinyl acetate, or of N-vinylformamide or—after the polymerization process—its partial or complete vinylamine hydrolyzate.

Particularly suitable copolymers are those composed of N-vinylpyrrolidone (VP) with vinyl acetate using a ratio by weight VP/NAc which is from 20:80 to 80:20, for example 30:70, 50:50, 60:40, 70:30, with K values of from 10 to 100, preferably from 20 to 50; copolymers composed of VP and VI, for example with a ratio by weight VP/VI of 1:1; copolymers composed of VP and VCap, for example with a ratio by weight of 1:1, with K values of from 10 to 100, preferably from 20 to 75.

Other particularly preferred copolymers are those composed of N-vinylpyrrolidone or N-vinylcaprolactam and 1-vinyl-3-methylimidazolium chloride or 1-vinyl-3-methylimidazolium sulfate (obtained via quaternization of 1-vinylimidazole with methyl chloride and, respectively, dimethyl sulfate) using a ratio by weight VP/QVI of from 20:80 to 99:1, where the molecular weights of the copolymers can be from 40 000 to >1 000 000 daltons.

Composite foils used according to the invention are in particular used to stabilize water-soluble NVP homopolymers having K values of from 1 to 150, preferably from K10 to K120, for example K12, K15, K 17, K25, K30, K60, K85, K90, K 115, 120.

Other particular materials comprised are the crosslinked, water-insoluble polyvinylpyrrolidone polymers, such as crospovidone, and also copolymers analogous to crospovidone and composed of N-vinylpyrrolidone and N-vinylimidazole, of N-vinylpyrrolidone and N-vinylcaprolactam, and of N-vinylpyrrolidone and vinyl acetate.

Other polymers susceptible to oxidation for the purposes of this invention are mixtures which comprise the polymers susceptible to oxidation. The mixtures can be obtained, for example, via mixing of the other constituents with the polymers susceptible to oxidation after separate production of these, or via mixing in a shared upstream process step, such as coextrusion, the drying of solutions or suspensions which comprise polymers of this type, or the polymerization process. By way of example, vinyl acetate can be polymerized in the presence of, inter alia, polyvinylpyrrolidone, as auxiliary.

The term other constituents also comprises other polymers and organic and inorganic substances. Other constituents can also be other polymers selected from the polymers of the invention that are susceptible to oxidation. Mixtures of this type can, as a function of application and intended use, receive admixtures of further additives, subsequently or prior to the mixing process, examples being dyes, pigments, emulsifiers, surfactants, odorants, active ingredients, or other substances having special effects, being drawn off into the packaging only after said further mixing step has been completed.

The invention also comprises liquid- or paste-form mixtures of polymers susceptible to oxidation, examples being creams, oils, solutions, or suspensions.

The expression other constituents, where these may be organic or inorganic substances also means suitable solvents or dispersion media, such as water, alcohols, such as methanol, ethanol, propanol, isopropanol, butanol, glycerols, glycols, polyethylene glycols, aliphatic or aromatic hydrocarbons, or a mixture thereof. The mixtures in the form of liquid or of paste comprise water, alcohols, or water and alcohols, where these alcohols are in particular methanol, ethanol, and/or isopropanol.

Preferred mixtures comprise polyvinylpyrrolidone, crospovidone, graft polymers composed of PEG and/or of vinyl acetate which has not, has partially, or has entirely been hydrolyzed to give vinyl alcohol, and also copolymers of N-vinylpyrrolidone and vinyl acetate.

According to another preferred embodiment of the invention, the packaging is used for crosslinked water-insoluble vinyllactam homo- and copolymers. Crosslinked polymers of this type can have been crosslinked chemically or physically. Preference is given to polymers crosslinked using divinylethyleneurea or using in-situ-generated crosslinking agents, e.g. 1-vinyl-3-ethylidenepyrrolidone and ethylidenebis-3-(N-vinylpyrrolidone). These materials are in particular crospovidone or a copolymer composed of VI and VP in a ratio by weight of 90:10 with 2% by weight of divinylethyleneurea, based on the total amount of VP and VI.

The production of polymers of this type via free-radical polymerization is known per se. The polymerization process can also take place in the presence of other conventional crosslinking agents.

The polymerization process can by way of example be conducted as a solution polymerization process in a suitable solvent, such as water, mixtures composed of water and of organic solvents, for example ethanol-water or isopropanol-water mixtures, or in purely organic solvents, such as ethanol, isopropanol, or esters, such as ethyl acetate or butyl acetate.

Another possible polymerization method is the popcorn polymerization process known per se, which leads to a crosslinked water-insoluble polymer (Breitenbach et al., IUPAC International Symposium on Macromolecular Chemistry, Budapest 1969 (pages 529-544)).

Composite foils is the term used for multilayer foils or multilayer laminates, which respectively can be used to manufacture flexible or self-supporting packaging. Composite foils with barrier-layer properties are also termed barrier foils. The composite foils used for the packaging comprise barrier layers which are intended to restrict gas permeability, in particular oxygen permeability. The composite foils can comprise one or more barrier layers. The composite foils preferably comprise one barrier layer.

The gas permeability data here are based on a selected reference gas, such as oxygen.

In the determination methods ASTM D3985 and DIN 53380/3, the oxygen permeability of the foils and of the packaging made thereof is less than 0.5 $cm^3/(m^2 \times d \times bar)$, preferably less than 0.45 $cm^3/(m^2 \times d \times bar)$, and particularly preferably 0.4 $cm^3/(m^2 \times d \times bar)$, or lower, at 23° C. and 50% relative humidity.

The standard ASTM D3985 used to determine the barrier properties of multilayer structures describes the constant oxygen permeability value of EVOH, using a coulometer for determinations on foils (test specimens).

The water-vapor permeability of the composite foils and of the packaging made thereof to ASTM F1249 is smaller than 0.5 $g/cm^2 \times d$, preferably smaller than 0.4 $g/cm^2 \times d$, and particularly preferably 0.3 $g/cm^2 \times d$ or less at a temperature of 23° C. and at 85% relative humidity.

Water-vapor permeation to DIN EN12086-KlimaB, taking an alternative determination method, is smaller than 0.5 $g/m^2 \times d$, preferably smaller than 0.4 $g/m^2 \times d$, and in particularly preferably smaller than or equal to 0.35 $g/m^2 \times d$.

A composite foil is one manufactured from individual layers. The structure of the individual monofoils for the composite here can be the result of adhesive lamination using solvent or without use of solvent. Other possibilities are extrusion lamination and extrusion coating.

In the extrusion process, the molten and homogenized polymers intended for the respective layers are continuously forced under pressure through a die, and are then pressed by vacuum onto a shaping profile and cooled in a waterbath. The extrusion process can take the form of extrusion coating or coextrusion coating.

The first type of lamination is a process aimed at bonding a number of sublayers of foils of identical or different materials using what is known as a laminating material (lacquer, wax, glue). This type of lamination can add desired properties to a material and also apply a protective and decorative layer.

A second type of lamination means bonding of a thin foil layer to a backing material by means of an adhesive. In the hot version of this type of lamination, for example, two foils fuse with one another by way of the adhesive, which is solid at room temperature, by being conducted together over a hot roller. In contrast, the cold version of this type of lamination can be undertaken manually without any particular equipment, since there is a standard adhesive in the foil pouch.

Backing foil is the term used for the foil layer which is usually intended to be used for the printing of the foil (the "external side" of the composite foil). Since the intrinsic barrier provided by the backing foil is mostly inadequate, at least one barrier layer in the form of a sealable foil is also introduced. In the simplest case, the resultant composite foil is then a foil composed of three layers, also termed triplex. It is also possible to combine backing foils with different barrier layers.

As a function of the backing material used, the properties of a composite foil can vary enormously. The materials most often used are, alongside polyesters, polyamide (PA) and polyvinyl chloride, and also cellophane and polyolefins.

Examples of suitable polyesters are polycarbonates or polyethylene terephthalates (PET).

Examples of suitable polyolefins are polypropylene (PP) or polyethylene (PE). Said polyolefins can be used either as low-density products (LD), or as medium-density products (MD), or as high-density products (HD), and LD polyethylene (LDPE) is particularly used.

Cellophane or cellulose hydrate is one of the oldest plastics for packaging materials; this is a thin, transparent, colorless foil composed of viscose with a characteristic crackle effect.

The barrier layer is composed of at least one polyvinyl alcohol polymer. According to the invention, polyvinyl alcohols are copolymers. Comonomers that can be used are compounds having crosslinking action, which render the polyvinyl alcohol homopolymer water-insoluble, whereas this is intrinsically water-soluble. However, it is also possible to use copolymers composed of vinyl alcohol and of monoolefinically unsaturated comonomers. Particular comonomers that can be used are ethylene, propylene, 1-butene, acrylic acid, methacrylic acid, crotonic acid, phthalic acid, maleic acid, acrylamide, methacrylamide, or N—$C_1$-$C_{18}$-alkyl(meth)acrylamides. Other suitable comonomers are N-vinyl monomers, such as N-vinylpyrrolidone, N-vinylformamide, N-vinylacetamide, $C_1$-$C_{18}$-alkyl or -hydroxyalkyl vinyl ethers, vinylsilanes, or allyl compounds, such as allyl alcohol or allyl acetate.

Particularly preferred polyvinyl alcohol polymers are ethylene-vinyl alcohol polymers in particular having an ethylene content of from 20 to 60 mol %, preferably from 25 to 55 mol %, these being obtained via copolymerization of ethylene and vinyl acetate and subsequent hydrolysis of the acetate groups. The degree of hydrolysis can be from 90 to 99.5 mol %, but preference is given to from 98 to 99 mol %.

Particularly preferred copolymers are those composed of ethylene and vinyl alcohol, these also being termed EVA polymers or EVOH polymers. Polymers of this type are commercially available, for example in the form of EVAL™ resins from Kuraray, examples being the product lines EVAL™ F (32 mol % ethylene) with the products EVAL™ F171B and EVAL™ F101B, and also EVAL™ EF-XL or EVAL™ L (27 mol % ethylene) with the product EVAL™ L101B, etc.

There may also be adhesive layers (ADL: adhesive layer) between the individual layers.

Adhesive layers can be present by virtue of the production processes used for the production of the composite foils, i.e. for example during production via adhesive lamination. However, adhesive layers are also useful when compatibility between the adjacent layers is inadequate. The adhesive layer can be composed of conventional natural, semisynthetic, or synthetic adhesives. Preferred adhesives are those which are extrusion-processable.

Suitable adhesives are graft or linear copolymers.

Suitable adhesives are inter alia rubber elastomers, such as polyisobutene or ethylene-propylene rubbers.

Suitable adhesives are in particular polyolefins which have been acid- or anhydride-modified by grafting. The grafting process may use maleic acid or maleic anhydride, and the maleic-anhydride-modified polyolefins here can also have been entirely or to some extent hydrolyzed. Particular polyolefins in this connection are LLDPE (linear low-density polyethylene) or copolymers of ethylene and acrylic acid, or ethylene/vinyl acetate, and the acetate groups here can also have been entirely or to some extent hydrolyzed.

Adhesives of this type are commercially available, for example in the form of Bynel® products from Dupont or Modic® AP products from Mitsubishi Chemicals.

Cellulose adhesives are also in principle suitable. Adhesives of this type are commercially available by way of example in the form of Jelucel® products.

Mixtures composed of various adhesives can also be used.

The composite foils and the packaging produced therefrom preferably have at least three layers, where at least one backing layer and at least one barrier layer have been provided. There is no restriction on the number of possible layers, but the invention preferably uses composite foils composed of from 3 to 7, preferably from 3 to 5, layers.

The layer structure can be symmetrical or asymmetrical. In all cases it is useful to provide water-repellant layers on both sides of the barrier layer, in order to protect the slightly hygroscopic polyvinyl-alcohol-based barrier layer.

Adhesive layers can be applied between materials of this type which do not adhere well to one another within the film composite.

For that side of the composite foil facing toward the contents ("internal side" or "product-contact side"), it is advantageous to select a material which is inert toward the contents. The material of this layer is moreover intended to have minimum content of substances which can migrate into the contents under storage conditions, examples being plasticizers, antioxidants, antistatic agents, or lubricants. Examples of suitable materials are polyamides, polycarbonates, polyethylene terephthalates, polyolefins, such as polyethylene or polypropylene, and preferably LD polyethylene.

It is also possible to incorporate aluminum foils as further barrier layer.

The layer thickness of the composite foil can, as a function of the total number of layers present, be from 100 to 1000 μm. The layer thickness of the individual layers can vary from 5 to 250 μm. Typical layer thicknesses for the barrier layers are in the range from 10 to 50 μm, preferably from 10 to 25 μm. Typical layer thicknesses for the adhesive layers can be from 5 to 50 µm, preferably from 5 to 30 µm. Backing layers can have a thickness of from 30 to 300 µm.

Examples of suitable layer structures are:
PA/EVOH/PA/ADL/PO
PO/ADL/PA/EVOH/PA/ADL/PO
PA/EVOH/PA/ADL/PO
PE/ADL/EVOH/ADL/LDPE
PE/EVOH/LDPE
PA/ADL/PE/EVOH/LDPE
PET/ADL/EVOH/ADL/PET
PET/ADL/PA/EVOH/PET Any of the large number of possible combinations is possible.

The backing layers can also receive additions of conventional additives, such as colorants, plasticizers, antioxidants, antistatic agents, lubricants, or structure improvers. The composite foils, initially produced in the form of sheets, can be welded or adhesive-bonded to give any desired shape of packaging, for example to give bags or tubular packaging. It is also possible to use a welded or adhesive-bonded foil to line free-standing packaging, such as plastics drums or cardboard drums, or cardboard cartons. The composite foils used according to the invention can also be used for the inner lining of metal drums susceptible to corrosion.

It is also possible, by using a suitable layer structure, to design the composite foils so that they can be processed to give self-supporting packaging.

The person skilled in the art usually divides the packaging into flexible non-self-supporting, flexible self-supporting, and inflexible self-supporting packaging.

The design of the packaging can vary. A feature common to all of the forms is that they can form or have a cavity and that they have one or more apertures. The apertures are open or sealed apertures. Said apertures can be sealed by using various means and methods. In the closed state, the forms provide a leakproof seal between the interior of the cavity and the environment surrounding the form, where the means and methods described, and other means and methods known to the person skilled in the art, minimize any interchange between the exterior environment and the interior through the seal.

If the packaging is flexible and non-self-supporting, it typically takes the form of a flexible tube or of a bag.

The unfinished form of this flexible tube or bag usually has at least two open sides. One of these open sides is sealed prior to filling with the contents. The other side is sealed after filling with the contents. However, it is also possible that the flexible tube or the bag has another, third, or indeed a fourth or fifth, aperture. By way of example, this can serve, during the filling process or inertization process, to facilitate displacement of the gases present in the packaging, by permitting the gases to escape through an aperture other than the aperture that serves for filling with the contents. It is equally possible to utilize one or more of said further apertures as connections for inert-gas lines, in order to protect the packaging from the surrounding atmosphere, during or after the filling process, for example by introducing a stream of inert gas into the packaging, or by using a slightly superatmospheric pressure provided by an inert-gas supply line. Examples of this type of flexible tubular packaging (known as "foil bags" or else "flexible foil tube" or "flexible foil-tube bags") are flat bags and side-gusset bags, these being known to the person skilled in the art in the packaging sector.

In one preferred embodiment, the packaging used comprises side-gusset bags. A side-gusset bag has the advantage of very good fitting to the internal shape of outer packaging, for example cartons or drums, with resultant very good utilization of the space available in the outer packaging. Particular preference is given to side-gusset bags when the outer packaging used has angular or somewhat angular cross section, as in the case of cartons.

In another preferred embodiment, the packaging used comprises flat bags. They can be produced particularly easily and at low cost since the flexible foil tube does not have the fold present in side-gusset bags. However, they are not as good as side-gusset bags for fitting into outer packaging that is somewhat angular. Flat bags do, however, have good suitability for outer packaging with rounded cross sections, examples being drums.

Flexible tubular packaging can be produced from a flexible foil tube which is usually very long ("continuous flexible tube") with no longitudinal seam (in the direction of the greatest length). The flexible tube with no longitudinal seam is therefore produced from a single section.

However, it is also possible to produce this type of continuous flexible tube from a foil web which is usually rectangular, by secure bonding of the two long opposite edges of the rectangular shape, for example by welding these, and thus in turn producing a long, flexible tube, which now however does have a longitudinal seam. Seams are potential defect sites, however.

Preference is given to flexible tubular packaging in the form of continuous flexible tube with no longitudinal seam. Particular preference is given to flat bags with no longitudinal seam and to side-gusset bags with no longitudinal seam.

Flexible tubular packaging is provided in finished form, requiring no finishing operations to allow packaging of the polymers, or is provided in the form of continuous flexible tube which requires finishing operations immediately prior to the filling process. Examples of flexible tubular packaging in finished form requiring no further finishing operations are the abovementioned flat bags and side-gusset bags.

If the packaging is provided in the form of continuous flexible tube, said continuous flexible tube can be provided for example in the form of folded stack, or in a form that has been collapsed flat and wound up on a roll.

The form in which the continuous flexible tube is preferably provided is the form wound up on a roll.

The continuous flexible tube here has usually been collapsed flat and wound in that form.

The final operations to give the actual packaging then take place immediately prior to the filling process, by means of suitable equipment known to the person skilled in the art, for example for folding and sealing. The sealing of the flexible foil tube here, for example to give the flat bag or to give the side-gusset bag, preferably takes place via welding.

There are a number of advantages in the provision of the flexible tubular packaging in particular as wound-up continuous flexible foil tube, and also in delaying the production of the actual packaging until immediately prior to the process of filling with the polymers:

Firstly, the size of the packaging (the internal volume) and also the exact shape (for example flat bag or side-gusset bag) can be selected for each new form of packaging directly prior to the filling process without any interruption of the filling procedure. Secondly, space is saved when the packaging is delivered. Thirdly, when a continuous flexible tube is used, there is no need for complicated mechanical equipment or use of manpower to insert the prefabricated packaging into the machines. Fourthly, the risk of contamination of the packaging is minimized. This last factor is particularly advantageous during filling with polymers for highly demanding applications, such as medical technology, pharmaceuticals, the veterinary sector, and food and drink.

Overall, when the foils are used in the form of continuous flexible tube and when the final operations on these to give the actual packaging are delayed until immediately prior to the filling process, the result is a rapid, flexible, and therefore inexpensive procedure which can give additional advantages in the field of product purity when comparison is made with packaging delivered in a form prefabricated for the filling process.

A particularly preferred embodiment is therefore the use of the foils as continuous flexible tube, where the final operations on these to give the actual packaging are delayed until immediately prior to the filling process.

Self-supporting packaging is usually containers, such as bottles or drums. Self-supporting packaging is known in principle to the person skilled in the art in the packaging sector. It has at least one aperture. It can use filling methods identical with those for the non-self-supporting packaging. Further apertures can be used, as described for the flexible, non-self-supporting packaging.

In the case of all of the packaging, the as yet unsealed apertures are sealed after the filling process.

The sealing of the apertures of the packaging can be achieved by using various means and methods, examples being welding, adhesive bonding, gluing, tying, clamping, or screw-thread methods. These and other methods are known to the person skilled in the art in the packaging sector.

By way of example, in the case of welding it is possible to bond the following to one another: one portion of the composite foil in the region of an aperture to another portion of the composite foil at another region of the same aperture, or to a separate material which can in turn be composed of this type of single-layer foil or composite foil or of another type of single-layer foil or composite foil. Said bond is achieved via local exposure to heat in such a way that at least the outermost layer of the composite foil melts and bonds to the other portion, for example with application of mechanical pressure. On cooling, the bond becomes secure and ideally as stable as the remainder of the foil at unwelded regions. It is usually preferable that the portions of foil are mutually superposed in a manner which is as flat as possible and with very substantial avoidance of creases. During the welding process, the portions of foil are preferably pressed together and then heated locally at the site of pressure until the melting point of at least the material of the outermost foil layer has been exceeded. The person skilled in the art is aware of this type of procedure and of equipment suitable therefor.

A bond thus produced is ideally as impermeable as the composite foil to gas and to water, and thus improves the overall effect of the packaging in relation to penetration of water and of gases, such as oxygen.

As an alternative, the packaging can be adhesive-bonded or glued. In these processes, the apertures are generally closed in a manner analogous to welding, for example by mutually superposing two regions of the composite foil in such a way as to produce a shared area. Said shared area can be formed from external side and external side, external side and internal side, or internal side and internal side, of the composite foil. A suitable adhesive or glue is applied to said area, where the adhesive, appropriate to the design, has good adhesion to the material of which the respective side is composed, and preferably can give the bonding site a certain elasticity. The adhesive-bonding and gluing process can also use another piece of foil made of the same, or of other, material, in a manner analogous to the welding process.

Another method is tying or clamping. Here, the aperture is closed under pressure by using suitable measures in such a way as to give the tightest possible contact between the areas of foil. In the case of tying, for example, this can be achieved with use of a cable tie, strong thread, metal wire, or the like. In the case of clamping, a clamp made of metal or plastic, or of any other strong material, can be used for this purpose. By way of example, this clamping process uses a spring, or is a method in which the, usually, two portions of the clamp are connected via a peg made of, for example, plastic or metal, where the peg is securely attached to one of the portions and is forced toward the other portion of the clamp and interlocks and thus uses internal stress to close the clamp. Another suitable device is a screw-thread clamp; this presses the portions of foil tightly together when it is screwed tight.

In the case of self-supporting packaging, the aperture can also be clamped in another way: the dimensionally stable aperture can by way of example be covered with another dimensionally stable section made of polymer, multilayer laminate, metal, or a combination of these, where these are forced onto the aperture by suitable fastening devices and thus provide an interlock connection that covers and seals the aperture. Examples of suitable fastening devices are clamps or clips made of metal or of similarly strong materials.

In the case of screw-thread closures, a short tube-like section is provided at the aperture of the packaging, and the internal or external side of this tube has projecting studs or lugs, or a screw thread. The tube-like section has been attached to the foil in a manner which is secure and therefore gas- and water-tight. For closure, a cover is superposed and likewise has a screw thread, or has depressions or elevations corresponding to the studs or lugs, so that the cover becomes securely clamped by screwing onto the screw thread or by rotation on the studs or lugs, and thus seals the aperture.

The cover here can by way of example be composed of a polymer, or a multilayer laminate, of metal or of a composite material, or of a combination of these. Another possibility is the use of, for example, plastics as sealing material within the cover.

The preferred method of sealing in the case of flexible, non-self-supporting packages uses adhesive bonding, gluing, or welding. Welding is particularly preferred.

In the case of self-supporting packaging, preference is given to the use of screw-thread methods, adhesive bonding, and welding. Particular preference is given to screw-thread methods, and also to a combination of welding or adhesive bonding with screw-thread methods: the aperture is first covered by a flexible or inflexible cover, and adhesive-bonded to, or welded to, the packaging. Said cover is preferably made of a material which likewise has barrier properties. Particular preference is given to a material of which the barrier properties are at least identical with those of the composite foil used for the packaging. Another cover is then screwed onto, or clamped onto, said cover, and firstly provides a further barrier layer, but secondly also protects the first cover from mechanical effects.

When the packaging produced using the composite foils used is filled with the contents, the method can depend on the nature of the contents. The method of filling for pulverulent polymers is such that the packaging is fastened by interlock bonding at the filling apparatus. This type of fastening is preferably airtight, firstly in order to protect the contents from contamination from the surrounding atmosphere, or to minimize oxygen ingress, but also secondly in order to protect the environment from contamination by the contents, and the latter can be particularly advisable for fine-particle contents which generate severe dusting. However, another form in which the polymers are susceptible to oxidation can be used in the filling process is that of liquid: solution or dispersion.

The design of flexible packaging here, for example a bag or a flexible tube, is preferably such that the flexibility of the packaging itself and its matching to the shape of the filling apparatus can achieve an interlock. As an alternative, the filling apparatus can be of flexible design so that by way of example it can match the fixed shape of the self-supporting packaging, such as a drum or container.

The design of the packaging is such that the interior of the cavity thereof can be inertized. Inertization here means the complete or partial replacement of the gas phase within the cavity by a gas which is inert toward the contents, for example nitrogen or noble gases. In one preferred embodiment, the packaging comprising contents has been inertized.

The inertization here takes place prior to, during, or after filling of the packaging with the contents.

The process of filling with the contents can take place under normal atmospheric air. However, for polymers which are particularly susceptible to oxidation it can also be useful to operate under an inert gas atmosphere. This can be achieved by passing a stream of inert gas through the filling apparatus. Prior to the filling process, the packaging can also be flushed with inert gas or placed under inert gas. It can also be useful to evacuate the packaging prior to the treatment with inert gas, and then to fill it with inert gas. This can be done prior to or after the filling process.

Various inertization procedures are possible.

In one embodiment, the inertization is achieved by using inert gas for conditioning of the packaging prior to or after filling with the contents, in one or more cycles of evacuation and subsequent gas-refill.

In another embodiment, the inertization is achieved by conditioning the packaging in one or more cycles of introduction of inert gas under pressure and subsequent depressurization, prior to or after filling with the polymers susceptible to oxidation.

The two steps of evacuation and filling with inert gas, and also the two steps of applying inert gas under pressure and depressurization can respectively also be repeated a number of times in order to maximize exclusion of oxygen.

In another embodiment, the inertization is achieved by flushing the gas space in the packaging with inert gas after filling with the contents. The duration of the flushing process here is selected to be dependent on the internal volume of the pack and on the flow rate of the inert gas: the flushing time selected is usually sufficient to use a volume of the inert gas which corresponds at least to half of the internal volume of the packaging. The gas volume used preferably corresponds to the internal volume of the packaging multiplied by a factor of at least one, and in particular by a factor of at least 1.5.

If, in another embodiment, the inertization of the packaging is carried out prior to filling with the contents, the flushing time is usually sufficient to use a volume of the inert gas which at least corresponds to the internal volume of the packaging. The gas volume used preferably corresponds to the internal volume of the packaging multiplied by a factor of at least 1.5, and in particular by a factor of at least 2.

In another embodiment, the methods described for inertization are combined and carried out in parallel or in sequence: by way of example, the packaging is inertized by passage of inert gas prior to filling with the contents, and is then filled under a stream of inert gas, and the packaging comprising contents is then, in steps repeated one or more times, evacuated and refilled with inert gas. It is equally possible, by way of example, that the packaging is first filled with contents and then inertized by repetition, one or more times, of the steps of evacuation and gas refill, or by repetition, one or more times, of the steps of application of inert gas under pressure and depressurization.

However, a factor common to all of the methods for inertization and combinations of these is that the oxygen content in percent by volume of the gas phase in the packaging comprising contents is smaller than 13% by volume, preferably smaller than 12% by volume, and particularly preferably smaller than 10% by volume. In particular, it is particularly preferable to minimize the oxygen concentration as far as possible. It is therefore generally possible to achieve oxygen concentrations smaller than 5% by volume, preferably smaller than 3% by volume, and particularly preferably smaller than 1% by volume, by using the methods described or a combination of said methods.

It can also be useful to treat the contents with an inert gas prior to the filling process. This type of treatment can take place during spray drying, during discharge from the spray apparatus, during conveying of the spray product, or during intermediate storage.

Liquid contents, too, can be treated with inert gas prior to the filling process, for example when gas is reintroduced after distillation, or during conveying, or during intermediate storage.

Suitable inert gases are any of the gases that are inert under the process conditions, in particular nitrogen.

The composite foils used according to the invention, and the packaging process according to the invention, can be used to stabilize polymers susceptible to oxidation, with unexpectedly good effect in countering peroxide build-up and/or molecular-weight degradation.

The term polymers susceptible to oxidation is used by the person skilled in the art for any of the polymers that can enter into reactions with oxygen. Said reactions lead to discernible physical and chemical alterations in and on the polymer. These alterations are known to the person skilled in the art and can by way of example be macroscopic in the form of discoloration and color change, and change of solution viscosity, and/or can be microscopic, taking the form of measurable peroxide content within the polymer, molecular-weight alteration, formation of oxygen-containing chemical groups, such as OH, COOH, or CO groups, etc., and the like.

Said microscopic and macroscopic effects can be retarded or mitigated, or indeed entirely avoided, as a consequence of the use of composite foils of the invention and of the packaging process.

The polymers which are comprised within the packs of the invention and which are susceptible to oxidation exhibit unexpectedly good resistance to peroxide build-up and/or molecular-weight alteration.

The invention further provides outer packaging comprising the packs of the invention. The protection of the packaging comprising contents with respect to oxidative effects, such as peroxide build-up, discoloration, and/or molecular-weight degradation, can be further increased by combining the packs of the invention with outer packaging. The outer packaging is composed of a two- or three-dimensional material which encloses the pack. By way of example, this type of outer packaging involves single-layer or composite foils which are wound around the pack or into which the pack is placed, adhesive-bonded, or welded. In another embodiment, the outer packaging is composed of relatively inflexible materials, such as metal, of a fiber material using fibers derived from a natural and/or synthetic source, of wood, of polymers, of polymer laminates, or of a combination thereof.

The shape of the outer packaging here is usually that of a cube, block, or cylinder, or of a shape similar to these. Typical embodiments are rounded or angular containers, such as cartons, drums, and other shapes known to the person skilled in the art.

The packaging can have no connection to the outer packaging, or only non-fixed connection, or fixed connection.

If the packaging has no connection to the outer packaging, or only non-fixed connection, the packaging is introduced into the outer packaging prior to, during, or after filling with contents.

If the packaging has fixed connection to the outer packaging, the packaging is preferably introduced into the outer packaging and secured thereto prior to filling with contents. By way of example, it is possible to adhesive-bond a foil bag fixedly into, for example, a carton. In another embodiment, there is fixed connection between the composite foil and the outer packaging, for example in an embodiment also known as a juice carton.

It is preferable that the packaging has only non-fixed connection, or no connection, to the outer packaging. In particular it has no connection to the outer packaging.

The outer packaging of the invention is not only capable of improving the protective effect of the packaging with respect to oxidative effects, such as peroxide build-up, discoloration, and/or molecular-weight alteration of the contents, but is also capable of protecting the packs of the invention from effects caused by gases, liquids, solids, or action of mechanical force. By way of example, the outer packaging facilitates handling during transport and/or storage, and/or the application of inscriptions, printing, and/or adhesive layer.

One type of outer packaging that is preferred is produced from paperboard, an example being a (paper) carton. Another preferred type of outer packaging takes the form of a drum, in particular a drum with lid.

Drawings 1 to 9 show general features of the packaging of the invention, by way of example and without creating any restriction.

Drawing 1 shows the typical overall structure of a 3-ply and a 4-ply composite foil. All of the layers present have been numbered, but the adhesive layers have not been counted when arriving at the term, for example, "3"-ply composite foil.

Drawing 1 shows a 3-ply composition foil: layers 1 and 5 are the external sides of the composite foil, and layer 3 is the barrier layer. Layers 2 and 4 are the adhesive layers which keep the three layers of the composite foil together.

Drawing 1 also shows a 4-ply composite foil, which is composed of a total of up to 7 layers: it shows the presence of a further additional barrier layer 3', and it shows a further additional adhesive layer 2.

If the foil layers are sufficiently cohesive, for example through adhesion, it is also possible to omit the introduction of one or more, or all, of the adhesive layers (designated 2, 4, and 6 in drawing 1).

Drawing 2 is a diagram of what is known as a "flat bag", as flexible foil-tube packaging. This is monolaterally sealed prior to filling. By way of example, adhesive bonding or welding can be used to achieve this.

The sealing here is usually carried out in a way that prevents the packaging from opening even under the weight of the contents, once it has been filled. The seal can be achieved, for example, by using a single, double, or multiple welded or adhesive seam, or a combination thereof.

After the filling process, the remaining open end of the foil tube is usually likewise sealed, for example likewise by adhesive bonding or welding, or by tying or clamping.

Drawing 3 is a diagram of what is known as a side-gusset bag. This has been cut from a foil and closed by, for example, adhesive bonding and/or welding, in such a way as to produce packaging which can be of somewhat angular shape (viewed in cross section).

By virtue of this type of shaping, bags of this type can mostly also be successfully folded flat. The particular advantage of this type of shaping is moreover that this packaging provides good fit with angular environments, for example in particular angular outer packaging, such as cartons, and thus maximizes utilization of the internal Volume of the outer packaging. It is thus possible to maximize the amount of contents in the selected packaging (usually composed of packaging and outer packaging). It is also possible to produce this type of side-gusset bag with an oval to round cross section, instead of an angular cross section. Side-gusset bags of this type then fit very well into oval to round containers and outer packaging, for example buckets or drums. However, it is preferable that a side-gusset bag has an angular or somewhat angular cross section.

Drawings 4 and 5 show examples of embodiments of the seal in the form of adhesive bond and weld, and drawing 6 shows examples of embodiments of the clamping process.

The type of clamp shown is merely one example of the types known to the person skilled in the art.

Drawing 7 shows an example of an embodiment of the sealing process using a screw thread.

The closure is achieved by placing the cover onto the screw thread and rotating in the direction of the screw thread until the cover has been fixed on the screw thread. Within the interior of the cover there is advantageously a seal which, when the cover has been fixed, provides a leakproof seal of the packaging.

Drawing 8 shows an example of two types of packaging with two and, respectively, three apertures.

These apertures can by way of example serve for the filling or the emptying of the contents, and also for the introduction and/or discharge of gas streams. If one of the apertures is larger than the others, the larger aperture respectively usually serves for the filling or emptying of the contents, and the smaller apertures usually serve for the introduction and/or discharge of gas streams. The gas streams can of course comprise not only the gas but also portions of contents introduced or discharged with the gas. The number of apertures, and the use of these, are not subject to any restriction, but there is at least one aperture present. There are advantageously no more than three apertures present. An aperture here typically serves for the filling or emptying of the contents. A further aperture, or both further apertures, usually serve(s) for the introduction and/or discharge of gas streams.

By way of example, therefore, the packaging can be filled with the contents through an aperture. Any volume of gas that may be present in the packaging can escape through a further aperture during the filling procedure. It is thus by way of example to mitigate or indeed avoid generation of dust at the fill aperture. The second, or else the third, aperture, or both, can also be used to introduce inert gas. This serves by way of example for the inertization of the gas space of the packaging. On the other hand, a gas stream can also be used to remove dust which is produced from the contents during the filling process. By way of example, the third aperture can serve for the removal process.

In the case of the packaging shown by way of example in drawing 8, with the apertures 1, 2, and 3, the aperture 2 is advantageously used for the filling and emptying of the contents. Apertures 1 and 3 are advantageously used for a gas stream.

Drawing 9 shows by way of example two types of outer packaging in the form of a carton and also in the form of a drum with lid.

In the case of the carton, the underside (the base) is composed of from two to four flaps which are mutually superposed and fixed to one another and/or to the side walls of the carton. The fixing can be achieved by way of example by using adhesive bonding or clamping processes. After the packaging has been introduced and after filling with contents, or after introduction of the filled pack, the upper end (the cover) made of from two to four portions is—by analogy with the base—folded and fixed and thus closed.

If only two flaps are used for base and/or cover, it is advantageous to omit the flaps designated 1 and 2 in drawing 9.

In principle, it is also possible to use a larger number of flaps, instead of 2 or 4 flaps. The number of flaps is advantageously correlated with the cross section of the carton: in the case of rectangular cartons, the person skilled in the art usually uses 2 or 4 flaps. In the case of pentagonal cartons, the number of flaps is usually 5, and in the case of hexagonal cartons it is usually six or three, etc.

The drum with lid advantageously has, within the lid, a seal which, when the lid is placed onto the drum, seals the interior volume (the interior space) of the drum with respect to the environment. The lid is fixed by suitable means known to the person skilled in the art, examples being rings and clamps. It is also possible that the lid itself provides secure clamping of the same on the aperture of the drum by virtue of suitable shaping.

These types of outer packaging and other suitable types, such as bigbags, i.e. relatively large containers mostly in the form of bags and often produced from textile, containers of any possible shape, buckets, etc., are known to the person skilled in the art and are in principle equally suitable.

EXAMPLES

All of the foils used comply with the latest current regulations from the German, European and US Authorities and Institutions for the packaging of pharmaceutical products, foodstuffs, etc., e.g. the European Pharmacopeia, the regulations of the US FDA, or German packaging requirements.

Packaging 1 (foil 1) and packaging 2 (foil 2) (embodiments of the invention):

coextruded foils in the form of a flexible non-self-supporting foil bag

Barrier layer: EVOH polymer, thickness 15 μm (+−3 μm tolerance)

Adhesive: maleic-anhydride-modified polyethylene, Adoma SF 700, Mitsui Petrochemical Industries EVOH: EVAL™ F (Kuraray, Japan)

Polyethylene: LDPE

The foil bags, provided with antistatic properties on the outer side, had the shape of side-gusset bags. The tubular skin had been welded at the base (in the region from 10 to 20 mm above the lower edge of the tube).

Total foil-thickness tolerance: +−8% (to DIN 53 370)

Packaging 1:

Layer thickness: 150 μm

Layer structure: polyethylene/adhesive layer/EVOH/adhesive layer/polyethylene

Layer thicknesses [μm]: 50/16.5/15/16.5/50 (product side)

Dimension: 950 mm long, 390 mm wide, 300 mm gusset width, side-gusset bag

Packaging 2:

Layer thickness: 300 μm

Layer structure: polyethylene/adhesive layer/EVOH/adhesive layer/polyethylene

Layer thicknesses [μm]: 145/10/15/10/120 (product side)

Dimension: 950 mm long, 390 mm wide, 300 mm gusset width, side-gusset bag

Comparative Example: Packaging 3 and 4; Aluminum-PE-Laminate Foils

Structural Principle Applicable to these Examples:

The laminated layer (exterior skin) was composed of aluminum/adhesive layer/polyester/adhesive layer/PE. The subsequent interior PE layer in contact with the product was an unlaminated film (inner skin). This inner skin was inserted into the outer skin; the two skins were welded off together at the lower end (in the range from 10 to 20 mm above the lower edge of the tube). At the upper end of the edge of the tube, the two skins were fastened to one another via 10 strips, of length from 10 to 15 cm, of an adhesive, distributed at uniform intervals and running in the direction from the lower to the upper edge of the tube. At the upper end of the tube, the two foils were bonded securely via welding of the bag at the upper end of the tube, after the product-filling process.

The foil bags had the shape of what are known as side-gusset bags.

Packaging 3: (foil 3)

Layer thickness: 0.224 mm

Barrier layer: aluminum

Exterior skin (exterior foil): layer structure: aluminum/adhesive layer/polyester/adhesive layer/PE Layer thicknesses [μm]: 12/20/12/20/80

Interior skin (interior foil): polyethylene: LDPE 80 μm (product side)

Adhesive layer: based on natural materials

Dimension: 950 mm long, 390 mm wide, 300 mm gusset width, side-gusset bag

Packaging 4 (Foil 4)

Layer thickness: 0.264 mm

Barrier layer: aluminum

Exterior skin (exterior foil): layer structure: aluminum/adhesive layer/polyester/adhesive layer/PE Layer thicknesses [μm]: 12/20/12/20/100

Interior skin (interior foil): polyethylene: LDPE 100 μm (product side)

Adhesive layer: based on natural materials

Dimension: 950 mm long, 385 mm wide, 300 mm gusset width, side-gusset bag

Comparative Example

Packaging 5: polyethylene foil thickness 0.15 mm
Barrier layer: none
Layer structure: polyethylene
Layer thickness [μm]: 150
Polyethylene: HDPE
Dimension: 1000 mm long, 380 mm wide, 300 mm gusset width, side-gusset bag Each packaging 1 to 4 was introduced into a paper carton as outer packaging; packaging 5 was introduced into an HDPE drum with sealed lid (elastomer seal in the inner edge), and filled, and evacuated, and then treated with inert gas and welded, and then stored in the carton or the drum sealed with lid under the stated storage conditions for the stated period.

The number of packs placed into storage here was the same as the number of measurement times: at each measurement time, a pack which had remained unopened between the filling process and the measurement was then used, thus avoiding any contamination or data errors due to opening and resealing.

The initial value for peroxides was determined after the filling process and, respectively, after storage, after each stated number of months. Peroxide content was determined by UV photometry, by the titanyl sulfate method, as described for example in Ph. Eur. 6.

For comparison, the peroxide content of material stored in pure polyethylene bags or in bags composed of aluminum/polyethylene foils was determined.

Storage period at room temperature and normal room humidity: 25° C. and 60% relative humidity (r.h.), 30° C. and 70% relative humidity, and 45° C. and 75% relative humidity. For comparison, specimens were also stored at 5° C. in aluminum-PE foil bags.

The detailed results are listed in the tables below.

1) Polyvinylpyrrolidone, K value 30, solid powder

Examples of the Invention: Packaging 2

| Example No. | Storage period [months] at 30° C./70% r.h. Months | | | | | |
|---|---|---|---|---|---|---|
| | 0 | 1 | 3 | 6 | 9 | 12 |
| 1 | 24 | | 54 | 40 | 39 | 31 |
| 2 | 37 | | 44 | 18 | 31 | 35 |
| 3 | 33 | | 80 | 29 | 38 | 39 |

| | Storage period [months] at 45° C./75% r.h. Months | | | | | |
|---|---|---|---|---|---|---|
| | 0 | 1 | 3 | 6 | 9 | 12 |
| 4 | 24 | 63 | 37 | 23 | 25 | 20 |
| 5 | 37 | 55 | 33 | 21 | 20 | 16 |
| 6 | 33 | 37 | 40 | 43 | 22 | 20 |

Comparative Examples: Packaging 3

| Comparative example No. | Storage period [months] at 25° C./70% r.h. Months | | | | | |
|---|---|---|---|---|---|---|
| | 0 | 1 | 3 | 6 | 9 | 12 |
| 7 | 80 | | 90 | 100 | 130 | 130 |
| 8 | 70 | | 164 | 193 | 197 | 202 |
| 9 | 60 | | 175 | 204 | 210 | 212 |
| 10 | 50 | | 159 | 176 | 181 | 175 |
| 11 | 92 | | | 161 | | 128 |
| 12 | 75 | | | | | 156 |

| | Storage period [months] at 45° C./75% r.h. Months | | | | | |
|---|---|---|---|---|---|---|
| | 0 | 1 | 3 | 6 | 9 | 12 |
| 13 | 80 | | 130 | 150 | 170 | 150 |
| 14 | 70 | 147 | 236 | 255 | 233 | 197 |
| 15 | 60 | 131 | 229 | 507 | 247 | 209 |
| 16 | 50 | 149 | 200 | 196 | 216 | 199 |

Comparative Examples: Packaging 5

| Comparative example No. | Storage period [months] at 25° C., 60% r.h. Peroxide contents in [ppm] Months | | | |
|---|---|---|---|---|
| | 0 | 3 | 6 | 12 |
| 17 | 42 | 202 | 214.4 | 252 |
| 18 | 94 | 259 | 290 | 255 |
| 19 | 78 | 211 | 235 | 132 |
| 20 | 67 | 164 | 196 | 241 |
| 21 | 25 | 140 | 242 | 340 |
| 22 | 43 | 126 | 222 | 265 |
| 23 | 37 | 135 | 175 | 266 |

| Comparative example No. | Storage period [months] at 45° C., 75% r.h. Peroxide contents in [ppm] Months | | | | | | |
|---|---|---|---|---|---|---|---|
| | 0 | 1 | 2 | 3 | 4 | 5 | 6 |
| 24 | 130 | 284 | 228 | 233 | 250 | 229 | 254 |

2) Polyvinylpyrrolidone, K value 25, solid powder

Examples of the Invention: Packaging 2

| Example No. | Storage period [months] at 30° C., 70% r.h.; peroxide contents in [ppm] Months | | | | | |
|---|---|---|---|---|---|---|
| | 0 | 3 | 6 | 9 | 12 | 18 |
| 25 | 61 | 45 | <20 | 36 | 24 | 29 |

| | Storage period [months] at 45° C., 75% r.h.; peroxide contents in [ppm] Months | | | | | |
|---|---|---|---|---|---|---|
| | 0 | 3 | 6 | 9 | 12 | 18 |
| 26 | 61 | 28 | 37 | 20 | <20 | n.d. |

Peroxide contents remain at a very low level with a low peak value.

Comparative Examples: Packaging 3

|  | Months | | | | | |
|---|---|---|---|---|---|---|
| Example No. | 0 | 3 | 6 | 9 | 12 | 18 |
| | Storage period [months] at 25° C., 65% r.h.; peroxide contents in [ppm] | | | | | |
| 25 | 180 | 180 | n.d. | 190 | 166 | 227 |
| | Storage period [months] at 45° C., 75% r.h.; peroxide contents in [ppm] | | | | | |
| 26 | 180 | 170 | 170 | 170 | 239 | 140 |

3) Polyvinylpyrrolidone, K value 90, solid powder

Examples of the Invention: Packaging 2

|  | Storage period [months] at 30° C., 70% r.h.; peroxide contents in [ppm] | | | | | |
|---|---|---|---|---|---|---|
|  | Months | | | | | |
| Example No. | 0 | 3 | 6 | 9 | 12 | 18 |
| 27 | 69 | 74 | 53 | 54 | 47 | 42 |
| | Storage period [months] at 45° C., 75% r.h.; peroxide contents in [ppm] | | | | | |
| | Months | | | | | |
| | 0 | 1 | 3 | 6 | 9 | 12 |
| 28 | 69 | 59 | 60 | 41 | 39 | 31 |
| | Storage period [months] at 30° C., 70% r.h.; K values [no unit] | | | | | |
| | Months | | | | | |
| Example No. | 0 | 3 | 6 | 9 | 12 | 18 |
| 27 | 91.8 | 91.0 | 92.2 | 92.4 | 92.7 | 92.4 |
| | Storage period [months] at 45° C., 75% r.h.; K values [no unit] | | | | | |
| | Months | | | | | |
| | 0 | 1 | 3 | 6 | 9 | 12 |
| 28 | 91.8 | 92.0 | 91.6 | 92.1 | 92.5 | 92.1 |

Peroxide contents remain at a very low level with a low peak value. K values are very constant (well within measurement tolerances).

Comparative Examples: Packaging 4

|  | Months | | | | | |
|---|---|---|---|---|---|---|
| Example No. | 0 | 3 | 6 | 9 | 12 | 18 |
| | Storage period [months] at 5° C.; peroxide contents in [ppm] | | | | | |
| 29 | 107 | 127 | 150 | 100 | 103 | 100 |
| | Storage period [months] at 25° C., 65% r.h.; peroxide contents in [ppm] | | | | | |
| 30 | 107 | 123 | 110 | 103 | 220 | 100 |
| | Storage period [months] at 45° C., 75% r.h.; peroxide contents in [ppm] | | | | | |
| | Months | | | | | |
| | 0 | 2 | 3 | 6 | 9 | 12 |
| 31 | 107 | 90 | 157 | 290 | 73 | 53 |

|  | Months | | | | | |
|---|---|---|---|---|---|---|
| Example No. | 0 | 3 | 6 | 9 | 12 | 18 |
| | Storage period [months] at 5° C.; K values [no unit] | | | | | |
| 29 | 91.6 | 91.1 | 91.8 | 92.2 | 92.0 | 91.0 |
| | Storage period [months] at 25° C., 65% r.h.; K values [no unit] | | | | | |
| 30 | 91.6 | 91.0 | 91.4 | 91.2 | 88.0 | 91.4 |
| | Storage period [months] at 45° C., 75% r.h.; K values [no unit] | | | | | |
| | Months | | | | | |
| | 0 | 2 | 3 | 6 | 9 | 12 |
| 31 | 91.6 | 91.5 | 89.3 | 87.1 | 92.4 | 92.9 |

Peroxide contents rise markedly, in particular at 25° C. and 45° C., with a high peak value. There is a marked fall-off in peroxide content in the case of storage at 45° C. Problems with K value are apparent, individual packaging exhibiting a markedly reduced K value, resulting from molar mass degradation due to oxidation of the PVP.

4) Polytetrahydrofuran, molar mass 3200 g/mol

Examples of the Invention: Packaging 1

|  | Months | | | | | |
|---|---|---|---|---|---|---|
| Example No. | 0 | 3 | 6 | 9 | 12 | 18 |
| | Storage period [months] at 25° C., 65% r.h.; peroxide contents in [ppm] | | | | | |
| 32 | 41 | 52 | 61 | 53 | 39 | 31 |
| | Storage period [months] at 45° C., 75% r.h.; peroxide contents in [ppm] | | | | | |
| 33 | 41 | 65 | 72 | 61 | 45 | 38 |

Comparative Examples: Packaging 3

|  | Months | | | | | |
|---|---|---|---|---|---|---|
| Example No. | 0 | 3 | 6 | 9 | 12 | 18 |
| | Storage period [months] at 25° C., 65% r.h.; peroxide contents in [ppm] | | | | | |
| 34 | 95 | 156 | 194 | 221 | 253 | 286 |
| | Storage period [months] at 45° C., 75% r.h.; peroxide contents in [ppm] | | | | | |
| 35 | 95 | 173 | 201 | 243 | 255 | 246 |

5) Polyethylene glycol, molar mass 9000 g/mol

Examples of the Invention: Packaging 2

| Example No. | Months | | | | | |
|---|---|---|---|---|---|---|
| | 0 | 3 | 6 | 9 | 12 | 18 |
| | Storage period [months] at 25° C., 65% r.h.; peroxide contents in [ppm] | | | | | |
| 36 | 23 | 48 | 62 | 71 | 61 | 36 |
| | Storage period [months] at 45° C., 75% r.h.; peroxide contents in [ppm] | | | | | |
| 37 | 23 | 58 | 73 | 67 | 51 | 29 |

Comparative Examples: Packaging 4

| Example No. | Months | | | | | |
|---|---|---|---|---|---|---|
| | 0 | 3 | 6 | 9 | 12 | 18 |
| | Storage period [months] at 25° C., 65% r.h.; peroxide contents in [ppm] | | | | | |
| 38 | 51 | 76 | 89 | 102 | 143 | 176 |
| | Storage period [months] at 45° C., 75% r.h.; peroxide contents in [ppm] | | | | | |
| 39 | 51 | 87 | 113 | 126 | 143 | 101 |

6) Graft polymer composed of 25% by weight of polyethylene glycol and 75% by weight of polyvinyl alcohol, alcohol number 30 mg KOH/g, solid powder Examples of the Invention: Packaging 2

| Example No. | Months | | | | | |
|---|---|---|---|---|---|---|
| | 0 | 3 | 6 | 9 | 12 | 18 |
| | Storage period [months] at 25° C., 65% r.h.; peroxide contents in [ppm] | | | | | |
| 40 | 35 | 53 | 62 | 54 | 49 | 36 |
| | Storage period [months] at 45° C., 75% r.h.; peroxide contents in [ppm] | | | | | |
| 41 | 35 | 67 | 72 | 62 | 48 | 29 |

Comparative Examples

Packaging 5

| Example No. | Months | | | | | |
|---|---|---|---|---|---|---|
| | 0 | 3 | 6 | 9 | 12 | 18 |
| | Storage period [months] at 25° C., 65% r.h.; peroxide contents in [ppm] | | | | | |
| 42 | 65 | 105 | 163 | 190 | 214 | 254 |
| | Storage period [months] at 45° C., 75% r.h.; peroxide contents in [ppm] | | | | | |
| 43 | 65 | 123 | 181 | 225 | 249 | 276 |

7) Polyamide: 1,6-hexanedioic acid with 3-methyl-1,5-pentanediamine

Examples of the Invention: Packaging 1

| Example No. | Storage period [months] at 25° C., 65% r.h.; peroxide contents in [ppm] Months | | | | | |
|---|---|---|---|---|---|---|
| | 0 | 3 | 6 | 9 | 12 | 18 |
| 44 | 80 | 102 | 121 | 130 | 129 | 103 |

Comparative Examples: Packaging 5

| Example No. | Storage period [months] at 25° C., 65% r.h.; peroxide contents in [ppm] Months | | | | | |
|---|---|---|---|---|---|---|
| | 0 | 3 | 6 | 9 | 12 | 18 |
| 45 | 80 | 152 | 187 | 243 | 291 | 358 |

8) Polyvinylpyrrolidone, water insoluble, crosslinked (popcorn polymer), solid powder Examples of the Invention: Packaging 1

| Example No. | Months | | | | | |
|---|---|---|---|---|---|---|
| | 0 | 3 | 6 | 9 | 12 | 18 |
| | Storage period [months] at 30° C., 75% r.h.; peroxide contents in [ppm] | | | | | |
| 46 | 36 | 45 | 54 | 60 | 37 | <20 |
| | Storage period [months] at 45° C., 75% r.h.; peroxide contents in [ppm] | | | | | |
| 47 | 36 | 68 | 72 | 53 | 31 | <20 |

Comparative Examples: Packaging 3

| Example No. | Months | | | | | |
|---|---|---|---|---|---|---|
| | 0 | 3 | 6 | 9 | 12 | 18 |
| Storage period [months] at 25° C., 65% r.h.; peroxide contents in [ppm] | | | | | | |
| 48 | 56 | 102 | 135 | 173 | 186 | 214 |
| Storage period [months] at 45° C., 75% r.h.; peroxide contents in [ppm] | | | | | | |
| 49 | 56 | 124 | 141 | 208 | 276 | 257 |

9) Poly(vinylpyrrolidone-co-vinyl acetate), K value 38, ratio by weight of vinylpyrrolidone to vinyl acetate=60:40

Examples of the Invention: Packaging 2

| Example No. | Months | | | | | |
|---|---|---|---|---|---|---|
| | 0 | 3 | 6 | 9 | 12 | 18 |
| Storage period [months] at 30° C., 75% r.h.; peroxide contents in [ppm] | | | | | | |
| 50 | 34 | 42 | 41 | 42 | 37 | <20 |
| Storage period [months] at 45° C., 75% r.h.; peroxide contents in [ppm] | | | | | | |
| 51 | 34 | 58 | 65 | 60 | 28 | <20 |

Comparative Examples: Packaging 3

| Example No. | Months | | | | | |
|---|---|---|---|---|---|---|
| | 0 | 3 | 6 | 9 | 12 | 18 |
| Storage period [months] at 25° C., 65% r.h.; peroxide contents in [ppm] | | | | | | |
| 52 | 54 | 72 | 89 | 104 | 138 | 169 |
| Storage period [months] at 45° C., 75% r.h.; peroxide contents in [ppm] | | | | | | |
| 53 | 54 | 91 | 126 | 157 | 183 | 142 |

The invention claimed is:

1. A packaging comprising contents (pack) and a composite foil, which is formed by extrusion lamination or extrusion coating, the composite foil having a maximum oxygen permeability of less than 0.5 cm$^3$/(m$^2$×d×bar) at 23° C. and 50% relative humidity, which is provided with one oxygen gas barrier layer consisting of a copolymer consisting of ethylene and vinyl alcohol with an ethylene content of from 20 to 60 mol %, and the composite foil further comprising one or more backing layers selected from a polyester, polyamide, a polyvinyl chloride, a cellophane or a polyolefin, and an adhesive layer adjacent to and in direct contact with the barrier layer and the backing layer, where the contents consist essentially of one or more polymer powders which are susceptible to oxidation and optionally, one or more inert gases; wherein the one or more polymer powders which are susceptible to oxidation are selected from the group consisting of (i) homopolymers and copolymers of N-vinyl compounds, water-soluble or water-insoluble crosslinked homopolymer and copolymers of vinylpyrrolidone, vinylpyrrolidone-vinyl acetate copolymers, vinyl-acetate comprising polyether graft polymers, polyamides, polyethers, and (ii) a mixture of two or more of said polymers.

2. The packaging according to claim 1, wherein the one or more adhesive layers is based on maleic acid- or maleic anhydride-modified ethylene-vinyl acetate copolymers.

3. The packaging according to claim 1, wherein the thickness of the composite foil is from 100 to 1000 μm.

4. The packaging according to claim 1, wherein at least one backing layer is a water-repellant layer.

5. The packaging according to claim 1, wherein the packaging is a side-gusset bag or a flat hag.

6. The packaging according to claim 1, further comprising one or more inert gases.

7. The packaging according to claim 1, wherein the oxygen content of the gas volume in the pack is less than 13 percent by volume.

8. A package for storing one or more polymers that are susceptible to oxidation, the package comprising contents and a composite foil with at least three layers, wherein the composite foil is formed by extrusion lamination or extrusion coating, and has a maximum oxygen gas permeability of less than 0.4 cm$^3$/(m$^2$×d×bar) at 23° C. and 50% relative humidity, which is provided with one oxygen gas barrier layer consisting of a copolymer consisting of ethylene and vinyl alcohol with an ethylene content of from 20 to 60 mol % that has a thickness in the range from 10 to 25 μm, and at least one of the at least three layers is a backing layer polymer selected from polyester, polyamide, polyvinyl chloride, cellophane, or polyolefin and an adhesive layer adjacent to and in direct contact with the barrier layer and the backing layer, the thickness of the composite foil is from 100 to 1000 μm, and has a water vapor permeability of less than 0.4 g/cm$^2$×d, and wherein the contents consist essentially of the one or more polymers selected from (i) homopolymers and copolymers of N-vinyl compounds, water-soluble or water-insoluble crosslinked homopolymers and copolymers of vinylpyrrolidone, vinylpyrrolidone-vinyl acetate copolymers, vinyl-acetate-comprising polyether graft polymers, polyamides, polyethers, or (ii) a mixture of two or more of said polymers, and optionally, one or more inert gases.

9. The packaging according to claim 8, wherein the backing layer is polyolefin.

10. The packaging according to claim 9, wherein the oxygen content of the gas volume in the pack is less than 13 percent by volume.

11. The packaging according to claim 9, wherein the at least three layers of the composite foil comprise at least two of the adhesive layers.

12. An outer packaging comprising a packaging according to claim claim 1.

13. The outer packaging according to claim 12, wherein the outer packaging is a drum or a carton.

14. An outer packaging comprising a packaging according to claim claim 8.

15. The packaging according to claim 11, wherein the polyolefin is low density polyethylene (LDPE).

16. The packaging according to claim 11, wherein the barrier layer is adjacent to and disposed between two adhesive layers, and adjacent to each of the respective two adhesive layers is a first and a second backing layer.

17. The package according to claim 16 that contains a solid powder of polyvinylpyrrolidone, with a K value of 25, wherein the package is used to store the polyvinylpyrrolidone, and the measured peroxide content of the polyvinylpyrrolidone is lower at 18 months than it is at 3 months, if stored at 30° C. and 70% relative humidity, or at 45° C. and 75% relative humidity.

18. The package according to claim 16 that contains a solid powder of polyvinylpyrrolidone, with a K value of 90, wherein the package is used to store the polyvinylpyrrolidone, and the measured peroxide content of the polyvinylpyrrolidone is lower at 18 months than it is at 3 months, if stored at 30° C. and 70% relative humidity, or at 45° C. and 75% relative humidity.

19. The package according to claim 16 that contains polyethyleneglycol-9000, wherein the package is used to store the polyethyleneglycol-9000, and the measured peroxide content of the polyethyleneglycol-9000 is lower at 18 months than it is at 3 months, if stored at 25° C. and 65% relative humidity, or at 45° C. and 75% relative humidity.

20. The package according to claim 1, wherein the one or more polymer powders is a powder of polyvinylpyrrolidone with a K value of 25, or a powder of polyvinylpyrrolidone with a K value of 90, wherein the package is used to store the polyvinylpyrrolidone, and the measured peroxide content of the polyvinylpyrrolidone is lower at 18 months than it is at 3 months, if stored at 30° C. and 70% relative humidity, or at 45° C. and 75% relative humidity.

21. The package according to claim 1, wherein the one or more polymer powders is a powder of polyethyleneglycol-9000, wherein the package is used to store the polyethyleneglycol-9000, and the measured peroxide content of the polyethyleneglycol-9000 is lower at 18 months than it is at 3 months, if stored at 25° C. and 65% relative humidity, or at 45° C. and 75% relative humidity.

\* \* \* \* \*